United States Patent
Kadoda

(10) Patent No.: US 10,015,351 B2
(45) Date of Patent: Jul. 3, 2018

(54) INSTRUCTION APPARATUS, PROCESSING APPARATUS, AND PROCESSING SYSTEM

(71) Applicant: FUJI XEROX CO., LTD., Tokyo (JP)

(72) Inventor: Akira Kadoda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/362,699

(22) Filed: Nov. 28, 2016

(65) Prior Publication Data

US 2017/0310843 A1 Oct. 26, 2017

(30) Foreign Application Priority Data

Apr. 20, 2016 (JP) ................................. 2016-084191

(51) Int. Cl.
*H04N 1/00* (2006.01)
*H04N 1/32* (2006.01)

(52) U.S. Cl.
CPC ..... *H04N 1/00973* (2013.01); *H04N 1/00307* (2013.01); *H04N 1/00315* (2013.01); *H04N 1/00344* (2013.01); *H04N 1/00347* (2013.01); *H04N 1/32101* (2013.01); *H04N 2201/0075* (2013.01); *H04N 2201/0094* (2013.01)

(58) Field of Classification Search
USPC ................................. 358/1.1–3.29, 1.11–1.18
See application file for complete search history.

(56) References Cited

U.S. PATENT DOCUMENTS

| | | | |
|---|---|---|---|
| 2012/0099128 A1* | 4/2012 | Yoshida | H04N 1/00411 358/1.13 |
| 2012/0262749 A1* | 10/2012 | Yamamoto | H04N 1/00244 358/1.14 |
| 2013/0235414 A1* | 9/2013 | Iwamoto | G06K 15/4005 358/1.14 |
| 2014/0101546 A1* | 4/2014 | Taoka | G06F 3/0481 715/708 |
| 2015/0002888 A1* | 1/2015 | Tsujimoto | G03G 15/502 358/1.14 |

FOREIGN PATENT DOCUMENTS

| | | |
|---|---|---|
| JP | 2005-114790 A | 4/2005 |
| JP | 2007-142912 A | 6/2007 |
| JP | 2015-062320 A | 4/2015 |

* cited by examiner

*Primary Examiner* — Marcellus Augustin
(74) *Attorney, Agent, or Firm* — Oliff PLC

(57) ABSTRACT

An instruction apparatus that instructs a processing apparatus to perform a process includes an information acquiring unit, an apparatus-information transmitting unit, and a display. The information acquiring unit acquires information on the processing apparatus. The apparatus-information transmitting unit simultaneously transmits the information on the processing apparatus acquired by the information acquiring unit and information on the instruction apparatus to a management apparatus. Based on the information on the processing apparatus and the information on the instruction apparatus transmitted from the apparatus-information transmitting unit, an operation-screen generating unit included in the management apparatus generates an instruction-apparatus operation screen. An operation-screen transmitting unit included in the management apparatus transmits information of the instruction-apparatus operation screen to the instruction apparatus. The display displays the instruction-apparatus operation screen.

13 Claims, 18 Drawing Sheets

INSTRUCTION APPARATUS, PROCESSING APPARATUS, AND PROCESSING SYSTEM

CROSS-REFERENCE TO RELATED APPLICATIONS

This application is based on and claims priority under 35 USC 119 from Japanese Patent Application No. 2016-084191 filed Apr. 20, 2016.

BACKGROUND

Technical Field

The present invention relates to an instruction apparatus, a processing apparatus, and a processing system.

SUMMARY

According to an aspect of the present invention, there is provided an instruction apparatus that instructs a processing apparatus to perform a process, the instruction apparatus including an information acquiring unit, an apparatus-information transmitting unit, and a display. The information acquiring unit acquires information on the processing apparatus. The apparatus-information transmitting unit simultaneously transmits the information on the processing apparatus acquired by the information acquiring unit and information on the instruction apparatus to a management apparatus. On the basis of the information on the processing apparatus and the information on the instruction apparatus transmitted from the apparatus-information transmitting unit, an operation-screen generating unit included in the management apparatus generates an instruction-apparatus operation screen, an operation-screen transmitting unit included in the management apparatus transmits information of the instruction-apparatus operation screen to the instruction apparatus, and the display displays the instruction-apparatus operation screen.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
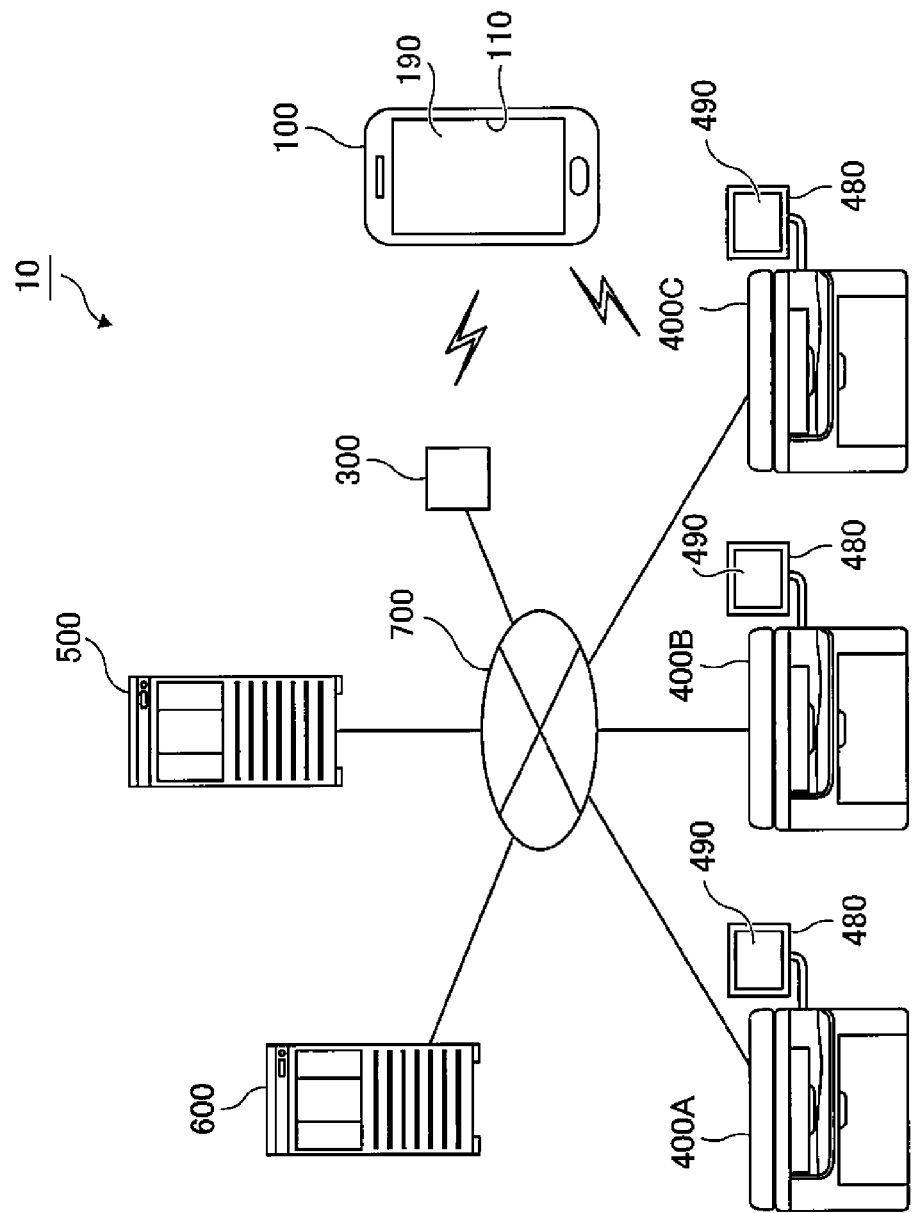
FIG. 1 illustrates a processing system according to an exemplary embodiment of the present invention.

Now, an exemplary embodiment for implementing the present invention will be described with reference to drawings. FIG. 1 illustrates a processing system 10 according to the exemplary embodiment of the present invention. The processing system 10 includes an instruction apparatus 100, a wireless communication apparatus 300, processing apparatuses such as three processing apparatuses 400A, 400B, and 400C, a management apparatus 500, and a data storing apparatus 600, which are connected to a network 700. In the following description, if there is no need to distinguish the processing apparatuses 400A, 400B, and 400C from one another, the processing apparatuses 400A, 400B, and 400C are collectively referred to as processing apparatuses 400.

The processing apparatuses 400 are data processing apparatuses. In this exemplary embodiment, as each of the processing apparatuses 400, a multi-function apparatus that is capable of processing data, such as copying, printing, facsimiling, scanning, and data storing, is used. The processing apparatus 400 includes a display 480 that displays a processing-apparatus operation screen 490 used for operation of the processing apparatus 400. As the display 480, it is possible to use a touch panel capable of serving as a display and also a receiver for operation. Although this exemplary embodiment illustrates three processing apparatuses 400 connected to the network 700, the number of processing apparatuses 400 connected to the network 700 may be any number greater than or equal to one.

The following description will illustrate an exemplary case where, among the three processing apparatuses 400A, 400B, and 400C, the processing apparatus 400C placed at the right in FIG. 1 is capable of performing wireless communication with the instruction apparatus 100 and processes data.

The instruction apparatus 100 is an apparatus that instructs the processing apparatuses 400 to process data. The instruction apparatus 100 is a mobile terminal, such as a smartphone, a tablet device, or a wearable computer. The following description will illustrate an exemplary case where the instruction apparatus 100 is a smartphone, which may be carried and connected to the network 700 via the wireless communication apparatus 300.

In addition, the instruction apparatus 100 is capable of communicating with the processing apparatuses 400. The instruction apparatus 100 is capable of communicating with the processing apparatuses 400 by using, for example, near-field wireless communication such as Wi-Fi, Bluetooth (registered trademark), or near-field communication (NFC). Since it is possible to perform communication between the instruction apparatus 100 and the processing apparatuses 400 in this manner, the instruction apparatus 100 is capable of acquiring apparatus information on each processing apparatus 400 and of instructing, through operation of the instruction apparatus 100, the processing apparatuses 400 to process data.

In addition, the instruction apparatus 100 includes a display 110 that displays an instruction-apparatus operation screen 190 that is used for instructing the processing apparatuses 400 to process data. As the display 110, it is possible to use a touch panel capable of serving as a display and also a receiver for operation.

To operate each of the processing apparatuses 400, an operator operates the display 110 or the display 480 included in the processing apparatus 400. At this time, the operator does not need to operate both the display 110 and the display 480 in order to perform a specific operation, and in some cases, the operator may operate each of the processing apparatuses 400 by operating the display 110 or the display 480.

The instruction-apparatus operation screen 190 displayed on the display 110 and the processing-apparatus operation screen 490 displayed on the display 480 are mutually different screens. In addition, on the instruction-apparatus operation screen 190 displayed on the display 110 and the processing-apparatus operation screen 490 displayed on the display 480, displayed items and the like are optimized in order to increase the usability on the basis of, for example, an operator's operation history. Details of the optimization of displayed items and the like on the instruction-apparatus operation screen 190 and the processing-apparatus operation screen 490 will be described later.

The data storing apparatus 600 is a so-called print server and stores, for example, for each operator, data that the processing apparatuses 400 are to be asked to process.

Figure 2:
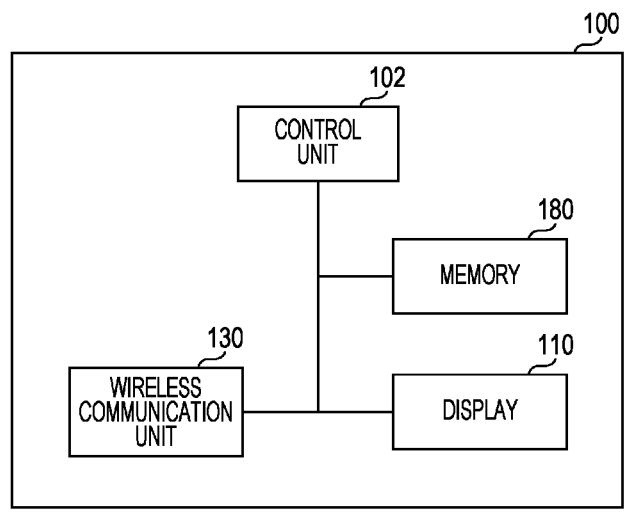
FIG. 2 is a block diagram illustrating a configuration of an instruction apparatus included in the processing system illustrated in FIG. 1.

FIG. 2 is a block diagram illustrating a configuration of the instruction apparatus 100. As illustrated in FIG. 2, the instruction apparatus 100 includes the above-described display 110.

The instruction apparatus 100 further includes a wireless communication unit 130. The wireless communication unit 130 performs wireless communication with the wireless communication apparatus 300 and thus connects the instruction apparatus 100 to the network 700 and enables the instruction apparatus 100 to communicate with the processing apparatuses 400. In addition, the wireless communication unit 130 communicates with the processing apparatuses 400 to acquire information on each processing apparatus 400, and transmits the acquired information on each processing apparatus 400 and information on the instruction apparatus 100 to the management apparatus 500. At this time, the wireless communication unit 130 simultaneously transmits the information on each processing apparatus 400 and the information on the instruction apparatus 100 to the management apparatus 500.

In the above manner, the wireless communication unit 130 is used as an information acquiring unit that acquires information on each processing apparatus 400 and also as an apparatus-information transmitting unit that simultaneously transmits the information on each processing apparatus 400 acquired by the information acquiring unit and the information on the instruction apparatus 100 to the management apparatus 500.

Examples of the information (data) that the wireless communication unit 130 acquires from each of the processing apparatuses 400 and transmits to the management apparatus 500 include equipped-function information, status information, general apparatus information, and apparatus-setting information. Here, the term "equipped-function information" means information regarding the functions with which the processing apparatus 400 is equipped, such as information indicating whether or not the processing apparatus 400 is equipped with a copying function, a facsimiling function, a scanning function, a printer function, an email function, a data storing function, or the like.

The term "status information" means, for example, information indicating the status (condition) of the processing apparatus 400 as to whether the processing apparatus 400 is in a standby condition, is in a power-saving condition, is performing a process, is being operated by an operator, is in a paper-out condition, is connected to an external apparatus, or the like. The term "general apparatus information" means, for example, general information regarding the processing apparatus 400, such as the product name (trade name), the version, or the serial number of the processing apparatus 400, and the size of the processing-apparatus operation screen 490 that the display 480 is capable of displaying. The term "apparatus-setting information" means information regarding the setting of the processing apparatus 400, such as network setting, which is the setting of connection to the network 700, printer setting, which is the setting of the printer function, parameter setting, which is the setting of various parameters, or security setting.

Examples of the information (data) on the instruction apparatus 100, the information being transmitted from the instruction apparatus 100 to the management apparatus 500, include general apparatus information, apparatus-setting information, accessibility-setting information, and application-setting information. The term "general apparatus information" means, for example, general information regarding the instruction apparatus 100, such as the product name (trade name), the version, or the serial number of the instruction apparatus 100, and the size of the instruction-apparatus operation screen 190 that the display 110 is capable of displaying. The term "apparatus-setting information" means, for example, information regarding the setting of the instruction apparatus 100, such as the setting of the language used in the instruction apparatus 100, the setting of location in which the instruction apparatus 100 is used, the date setting, or the time setting.

The term "accessibility-setting information" means, for example, information on the setting of the apparatus, the setting being provided in accordance with an operator's physical performance so as to increase the usability in the case where an operator is, for example, an elderly person or a handicapped person. More specifically, an example of such a setting may be a setting provided by a weak-sighted operator in such a manner as to increase the size of characters displayed on the display 110 in order to make it easier to read the characters displayed on the display 110. The term "application-setting information" means information on the setting of various applications installed in the instruction apparatus 100.

The wireless communication unit 130 simultaneously transmits the information on each processing apparatus 400 and the information on the instruction apparatus 100 to the management apparatus 500, and in addition, transmits data on an operation history of the instruction apparatus 100 to the management apparatus 500. Note that the timing at which the information on each processing apparatus 400 and the information on the instruction apparatus 100 are transmitted from the wireless communication unit 130 to the management apparatus 500 is before any of the processing apparatuses 400 performs a process, whereas the timing at which data on the operation history of the instruction apparatus 100 is transmitted to the management apparatus 500 is after completion of an operator's operation and after completion of a process by any of the processing apparatuses 400.

Figure 10:
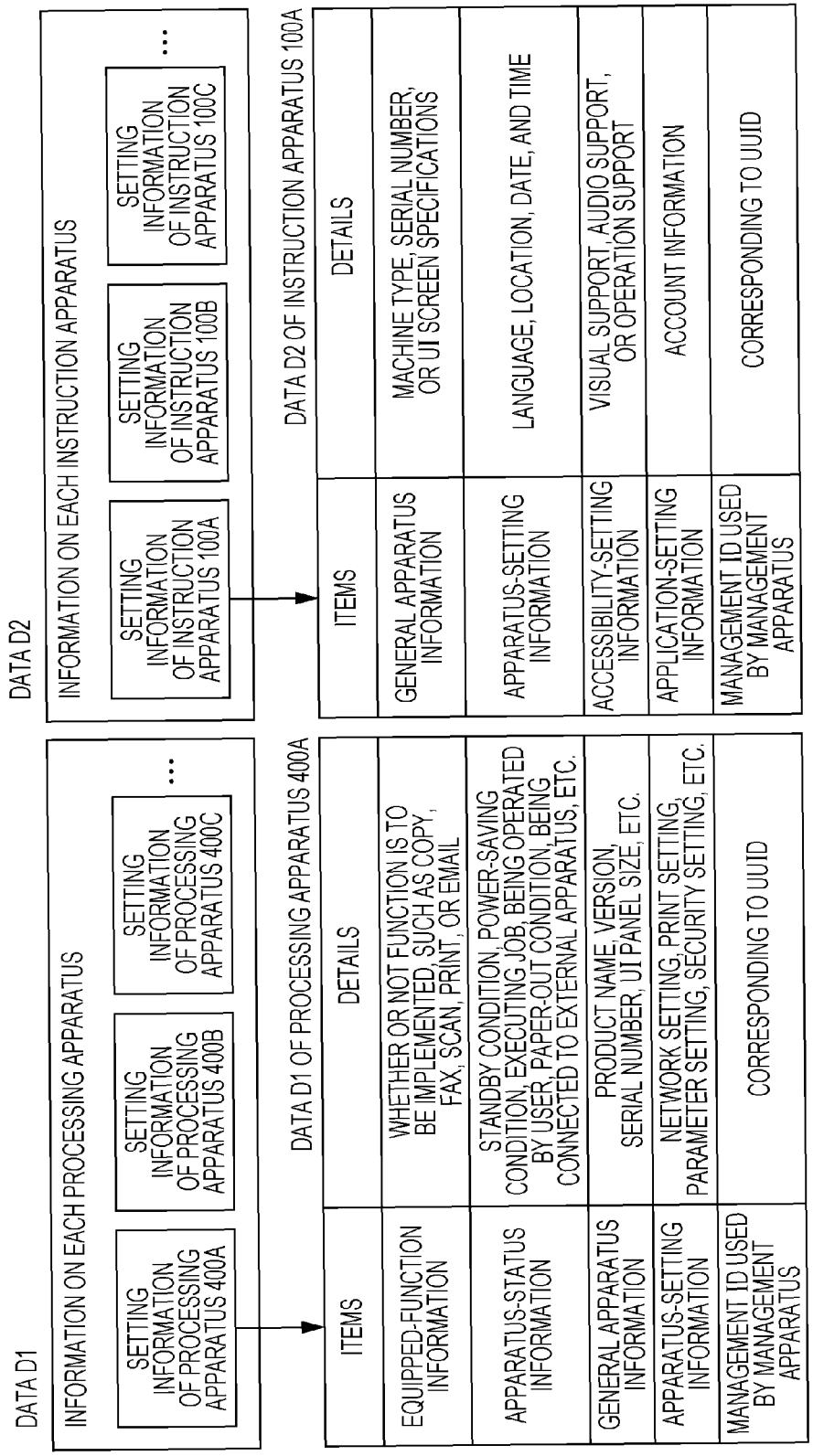
FIG. 10 illustrates details of data, which is information on processing apparatuses and instruction apparatuses.

The above various pieces of information to be transmitted to the management apparatus 500 are stored in a database of a storing unit 530 included in the management apparatus 500 (see FIG. 10).

In the above manner, the wireless communication unit 130 is used as an operation-history transmitting unit that transmits data on an operation history to the management apparatus 500 after completion of operator's operation.

The instruction apparatus 100 further includes a memory 180 and a control unit 102. The control unit 102 controls the display 110 and the wireless communication unit 130 in accordance with programs.

Figure 3:
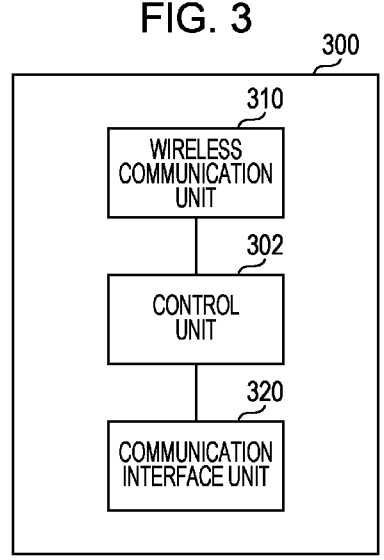
FIG. 3 is a block diagram illustrating a configuration of a wireless communication apparatus included in the processing system illustrated in FIG. 1.

FIG. 3 is a block diagram illustrating a configuration of the wireless communication apparatus 300. The wireless communication apparatus 300 serves as a wireless communication access point and includes, as illustrated in FIG. 3, a wireless communication unit 310, a communication interface unit 320, and a control unit 302. The wireless communication unit 310 performs wireless communication with, for example, the instruction apparatus 100. The communication interface unit 320 connects the wireless communication apparatus 300 to the network 700 so that communication is possible. The control unit 302 controls the wireless communication unit 310 and the communication interface unit 320.

Figure 4:
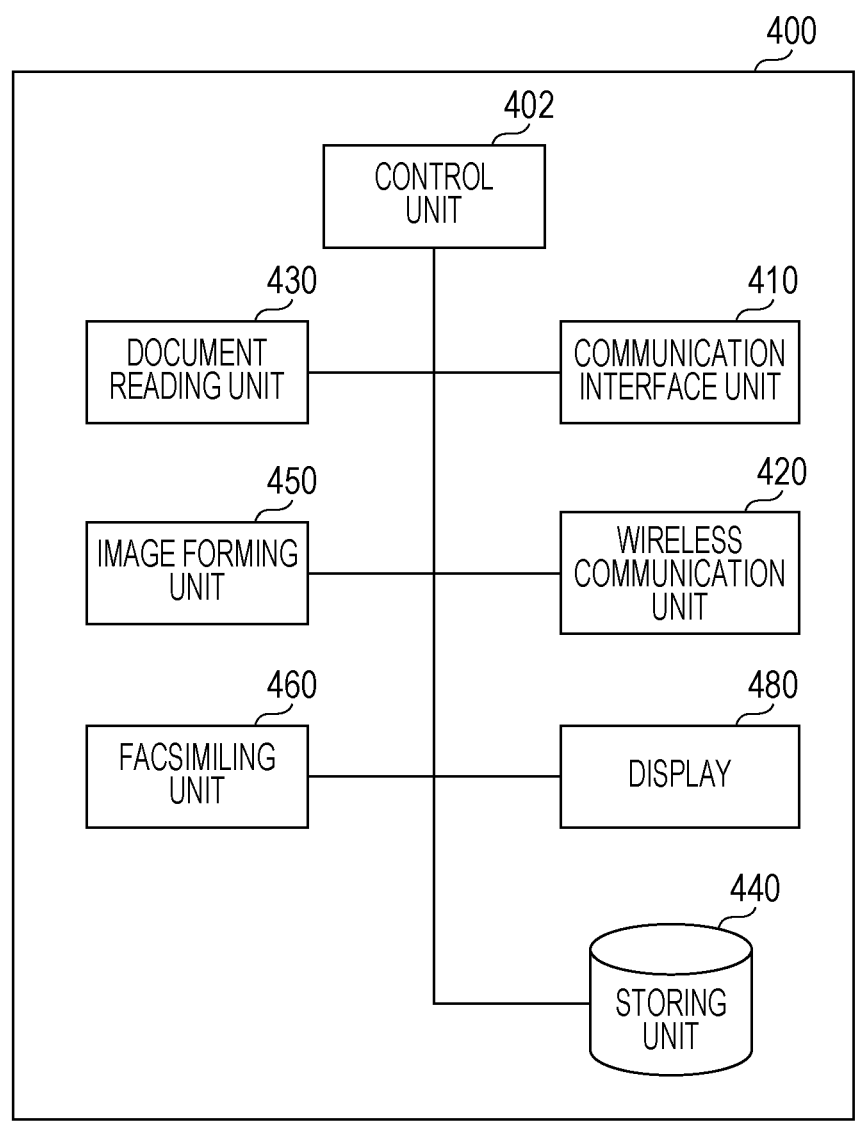
FIG. 4 is a block diagram illustrating a configuration of a processing apparatus included in the processing system illustrated in FIG. 1.

FIG. 4 is a block diagram illustrating a configuration of each processing apparatus 400. As illustrated in FIG. 4, the processing apparatus 400 includes the above-described display 480 and further a communication interface unit 410. The communication interface unit 410 connects the processing apparatus 400 to the network 700 so that communication is possible.

The processing apparatus 400 further includes a wireless communication unit 420. The wireless communication unit 420 enables the processing apparatus 400 to communicate with the instruction apparatus 100 by using wireless network communication. The wireless communication unit 420 transmits data on an operation history of the processing apparatus 400 to the management apparatus 500. Here, the timing at which data on the operation history of the processing apparatus 400 is transmitted to the management apparatus 500 is after completion of an operator's operation and after completion of a process by the processing apparatuses 400. In the above manner, the wireless communication unit 420 is used as an operation-history transmitting unit that transmits data on the operation history to the management apparatus 500 after completion of operator's operation.

The processing apparatus 400 further includes a document reading unit 430. The document reading unit 430 is a so-called scanner and reads a document placed on a document placing plate (not illustrated).

The processing apparatus 400 further includes a storing unit 440. For example, a hard disk drive may be used as the storing unit 440, and the storing unit 440 stores, for example, data such as image data that has been read by the document reading unit 430.

The processing apparatus 400 further includes an image forming unit 450. The image forming unit 450 employs, for example, an electrophotography system and forms, for example, an image on a sheet of paper that is used as a recording medium on the basis of image data that has been input from an external device or image data that has been read by the document reading unit 430.

The processing apparatus 400 further includes a facsimiling unit 460. The facsimiling unit 460 is connected to, for example, a telephone line, and transmits image data, for example, through the telephone line, and receives image data, for example, through the telephone line.

The processing apparatus 400 further includes a control unit 402. The control unit 402 controls the communication interface unit 410, the wireless communication unit 420, the document reading unit 430, the storing unit 440, the image forming unit 450, the facsimiling unit 460, and the display 480.

Figure 5:
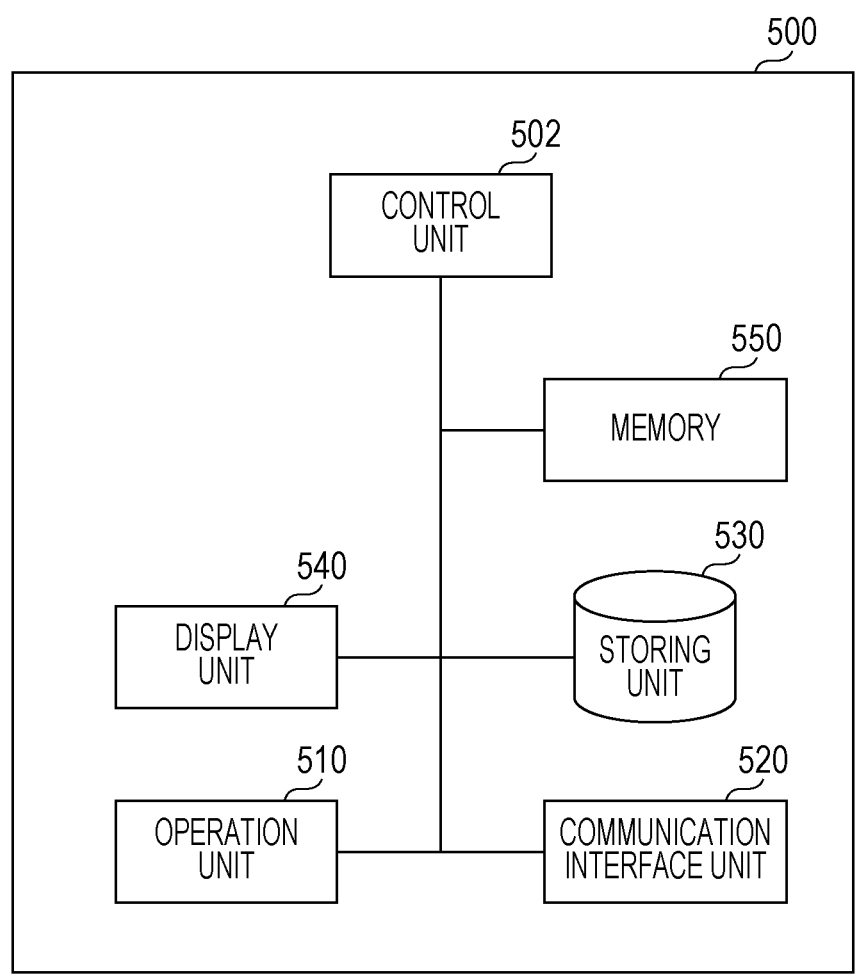
FIG. 5 is a block diagram illustrating a configuration of a management apparatus included in the processing system illustrated in FIG. 1.

FIG. 5 is a block diagram illustrating a configuration of the management apparatus 500. The management apparatus 500 is an apparatus that centrally manages the processing apparatuses 400 connected to the network 700 and manages the processing apparatuses 400 and the instruction apparatus 100. The management apparatus 500 includes an operation unit 510 as illustrated in FIG. 5. The operation unit 510 is used for operation of the management apparatus 500, and for example, a keyboard may be used as the operation unit 510.

The management apparatus 500 further includes a communication interface unit 520. The communication interface unit 520 connects the management apparatus 500 to the network 700 so that communication is possible. The communication interface unit 520 transmits information of the instruction-apparatus operation screen 190 (see FIG. 1) generated by a control unit 502, which will be described later, to the instruction apparatus 100. The communication interface unit 520 also transmits information of the processing-apparatus operation screen 490 (see FIG. 1) generated by the control unit 502 to each of the processing apparatuses 400. In the above manner, the communication interface unit 520 is used as an operation-screen transmitting unit that transmits the information of the instruction-apparatus operation screen 190 to the instruction apparatus 100 and that transmits the information of the processing-apparatus operation screen 490 to each of the processing apparatuses 400.

The management apparatus 500 further includes a memory 550 and a display unit 540 that may be formed of, for example, a liquid crystal display.

The management apparatus 500 further includes the storing unit 530. For example, a hard disk drive may be used as the storing unit 530. The storing unit 530 stores the information on the instruction apparatus 100 and the information on each processing apparatus 400, which have been transmitted from the instruction apparatus 100, in the database of the storing unit 530. In this manner, the storing unit 530 is used as an apparatus-information storing unit that stores the information on each processing apparatus 400 and the information on the instruction apparatus 100. In addition, the storing unit 530 stores, in the database of the storing unit 530, data on the operation history of the instruction apparatus 100 transmitted from the instruction apparatus 100 and data on operation histories of the processing apparatuses 400 transmitted from the processing apparatuses 400. In this manner, the storing unit 530 is used as an operation-history storing unit that stores the data on the operation history of the instruction apparatus 100 and the data on the operation histories of the processing apparatuses 400. Note that details of the data to be stored in the storing unit 530 will be described later.

The management apparatus 500 further includes the control unit 502. The control unit 502 controls the communication interface unit 520, the storing unit 530, the display unit 540, and the memory 550 on the basis of, for example, the operation performed on the operation unit 510.

In addition, by executing a program, the control unit 502 generates the instruction-apparatus operation screen 190 and the processing-apparatus operation screen 490. In this manner, the control unit 502 is used as an operation-screen generating unit that generates the instruction-apparatus operation screen 190 and the processing-apparatus operation screen 490. More specifically, the control unit 502 generates the processing-apparatus operation screen 490 and the instruction-apparatus operation screen 190 on the basis of the information on each processing apparatus 400 and the information on the instruction apparatus 100, which have been transmitted from the wireless communication unit 130 of the instruction apparatus 100. At this time, the control unit 502 may generate the processing-apparatus operation screen 490 and the instruction-apparatus operation screen 190 on the basis of the setting of the instruction apparatus 100 or may generate the processing-apparatus operation screen 490 and the instruction-apparatus operation screen 190 on the basis of the setting of each of the processing apparatuses 400.

Alternatively, the control unit 502 may generate the processing-apparatus operation screen 490 and the instruction-apparatus operation screen 190 on the basis of an operator's operation history of the instruction apparatus 100. Further alternatively, the control unit 502 may generate the processing-apparatus operation screen 490 and the instruction-apparatus operation screen 190 on the basis of an operator's operation history of each processing apparatus 400. More specifically, the control unit 502 generates the processing-apparatus operation screen 490 and the instruction-apparatus operation screen 190 on the basis of at least one of the operation history of the instruction apparatus 100 stored in the storing unit 530 and the operation history of each processing apparatus 400 stored in the storing unit 530.

Here, as an additional description of the operation history, the operator's operation history of each processing apparatus 400 includes, not only a specific operator's operation history, the operator being currently operating a processing apparatus 400, but also another operator's operation history, the other operator having previously operated the processing apparatus 400. In addition, the operator's operation history of each processing apparatus 400 includes, not only the operation history of a processing apparatus 400 that is currently being operated, but also an operation history of another processing apparatus 400 that is connected to the network 700.

In addition, the control unit 502 generates the instruction-apparatus operation screen 190 and generates the processing-apparatus operation screen 490 on the basis of whether or not data is stored in the data storing apparatus 600. For example, if an operator who is currently operating a processing apparatus 400 has stored data in the data storing apparatus 600 and the processing apparatus 400 is capable of processing the data, the control unit 502 generates at least one of the processing-apparatus operation screen 490 and the instruction-apparatus operation screen 190 in such a manner as to indicate that the data that may be processed by the processing apparatus 400 is stored in the data storing apparatus 600.

FIGS. 6A to 6E illustrate examples of the processing-apparatus operation screen 490 and the instruction-apparatus operation screen 190 generated by the control unit 502. In a first example illustrated in FIG. 6A, since English is set as the language in the instruction apparatus 100, the control unit 502 generates the processing-apparatus operation screen 490 and the instruction-apparatus operation screen 190 on which English is used. In addition, the control unit 502 generates the processing-apparatus operation screen 490 and the instruction-apparatus operation screen 190 in such a manner as to display an icon "Simple Copy" corresponding to an instruction for a copy process in which a document is copied in black only on one side without scaling up or down and an icon "Send FAX to Company A" corresponding to an instruction for sending a facsimile to Company A. This is because, according to the operation history, a process in which a document is copied in black only on one side without scaling up or down is most frequently performed, and a process in which a facsimile is sent to Company A is the second most frequently performed.

Figure 6A:
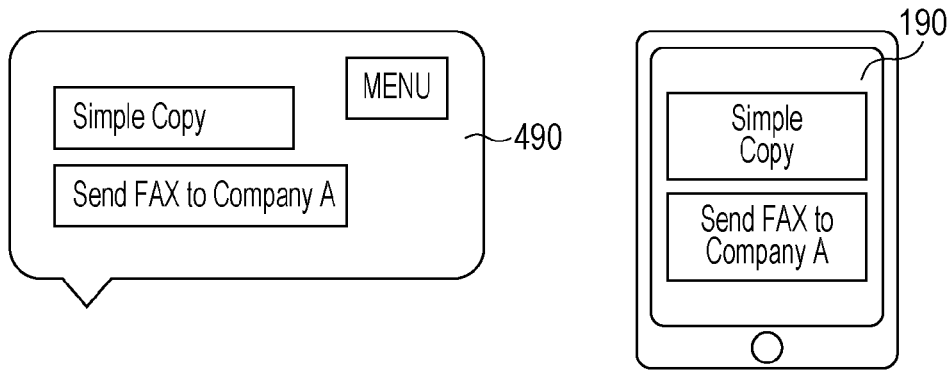
FIGS. 6A to 6E are first diagrams illustrating examples of a processing-apparatus operation screen and an instruction-apparatus operation screen.
Figure 6B:
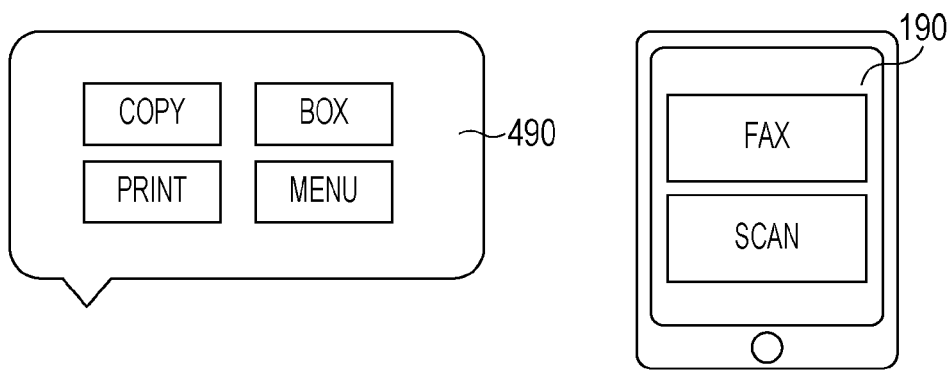

In a second example illustrated in FIG. 6B, the control unit 502 generates the processing-apparatus operation screen 490 and the instruction-apparatus operation screen 190 in such a manner that the size of characters is increased compared with that in a normal setting. This is because, in the accessibility setting of the instruction apparatus 100, a setting appropriate for a weak-sighted operator is provided in which larger characters than in a normal setting are displayed. In addition, the control unit 502 generates the instruction-apparatus operation screen 190 in such a manner as to display an icon "FAX" corresponding to an instruction for sending a facsimile and an icon "SCAN" corresponding to an instruction for scanning a document and generates the processing-apparatus operation screen 490 in such a manner as to display icons "COPY", "BOX", "PRINT", and "MENU" corresponding to other operation instructions. This is because, according to the operation history, a facsimile is sent most frequently, and a document is scanned the second most frequently.

Figure 6C:
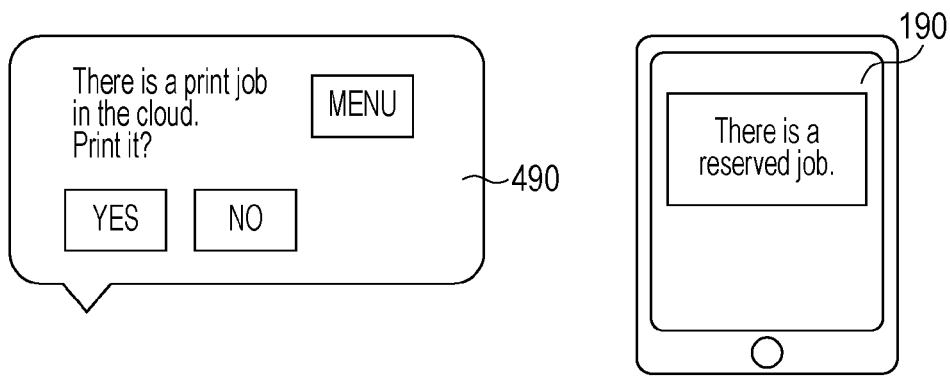

In a third example illustrated in FIG. 6C, on the basis of a reserved printing process (job) stored in the data storing apparatus 600, the control unit 502 generates the instruction-apparatus operation screen 190 in such a manner as to display a message "There is a reserved job". In addition, the control unit 502 generates the processing-apparatus operation screen 490 in such a manner as to display an icon "YES" corresponding to an instruction for executing the printing job stored in the data storing apparatus 600 and an icon "NO" corresponding to instruction for not executing the printing job stored in the data storing apparatus 600.

Figure 6D:
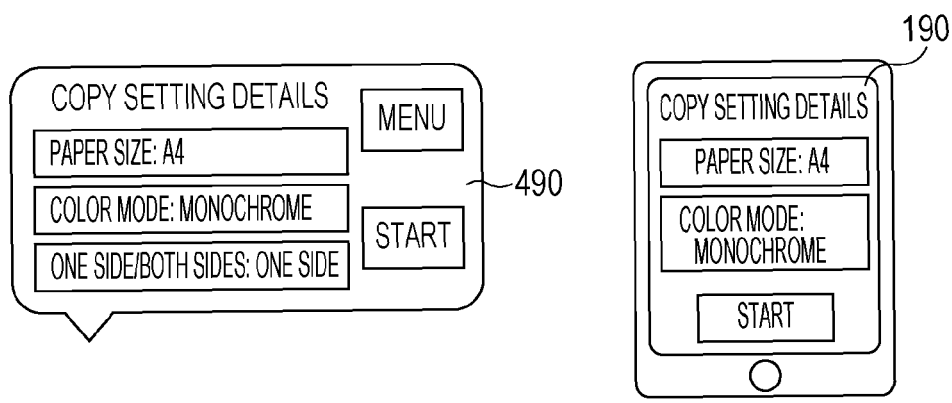

In a fourth example illustrated in FIG. 6D, the control unit 502 generates the instruction-apparatus operation screen 190 in such a manner as to display an icon "PAPER SIZE: A4" for selecting A4 as a paper size, an icon "COLOR MODE: MONOCHROME" for selecting black only as a copy color, and an icon "START" for immediately starting copying without changing the setting. This is because, according to the operation history, a document is copied on one side of A4 paper in monochrome (black only) most frequently. In addition, the control unit 502 generates the processing-apparatus operation screen 490 in such a manner as to display, in addition to the icons displayed on the instruction-apparatus operation screen 190, an icon "ONE SIDE/BOTH SIDES: ONE SIDE" for selecting copying on one side of paper.

Figure 6E:
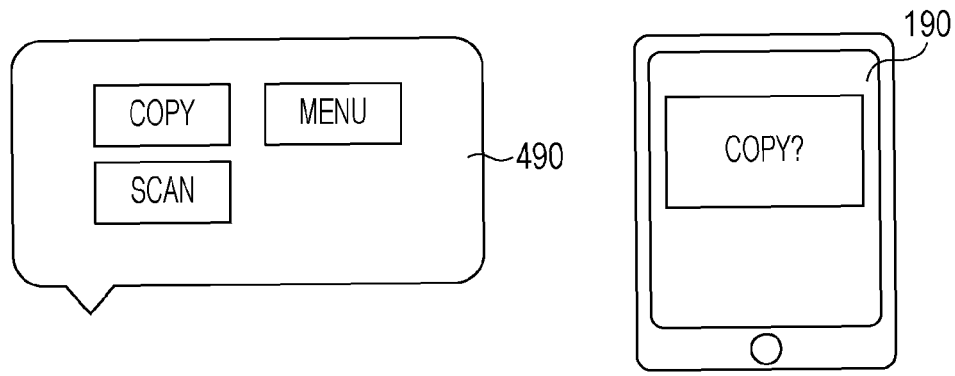

In a fifth example illustrated in FIG. 6E, the control unit 502 generates the instruction-apparatus operation screen 190 in such a manner as to display "COPY?" asking whether or not a document is to be copied and controls a sound output device (not illustrated) including a speaker and the like so as to cause the sound output device to guide the operation by using a voice saying "copy?". This is because, in the accessibility setting of the instruction apparatus 100, voice guidance for operation is set, and in addition, according to the operation history, the instruction for performing copying is most frequently used. In addition, the control unit 502 generates the processing-apparatus operation screen 490 in such a manner as to display an icon "COPY" corresponding to an instruction for copying, an icon "SCAN" corresponding to an instruction for scanning, and an icon "MENU" for transition to a menu selection screen.

Figure 7A:
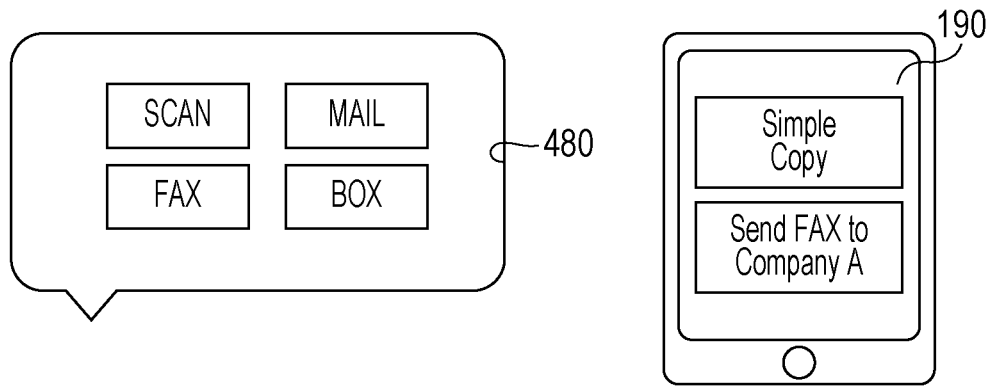
FIGS. 7A to 7C are second diagrams illustrating examples of a screen on the processing apparatus and the instruction-apparatus operation screen.
Figure 7B:
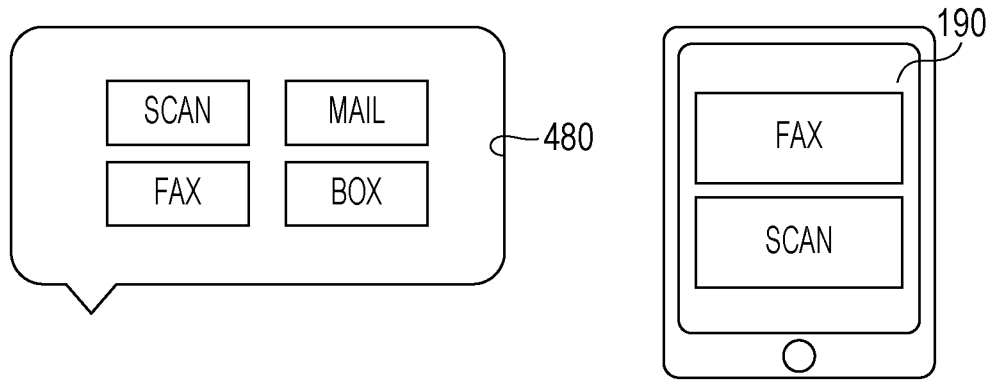
Figure 7C:
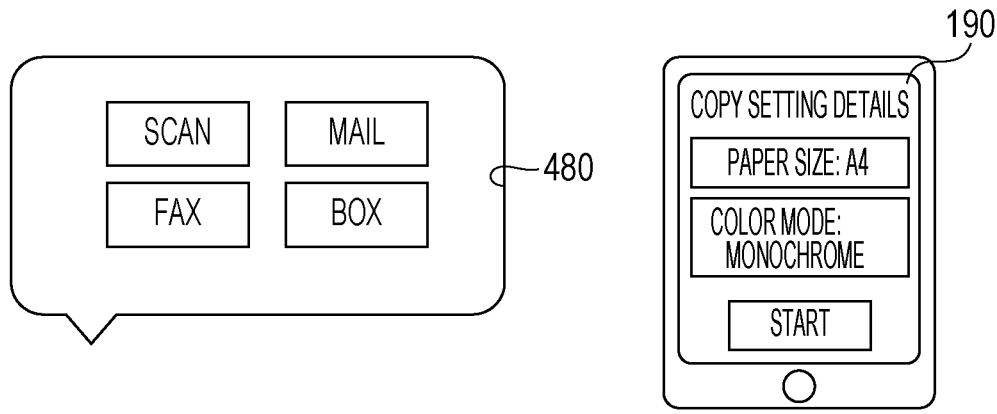

FIGS. 7A to 7C illustrate examples of a screen displayed on the display 480 of the processing apparatus 400 and examples of the instruction-apparatus operation screen 190 generated by the control unit 502. In the examples illustrated in 7A to 7C, the processing apparatus 400 does not have a function of changing the screen displayed on the display 480 although the processing apparatus 400 receives instructions for processes from the instruction apparatus 100. In the following examples, the control unit 502 does not generate the processing-apparatus operation screen 490, and a predetermined screen is displayed on the display 480 of the processing apparatus 400, and the instruction-apparatus operation screen 190 generated by the control unit 502 is displayed on the display 110 of the instruction apparatus 100.

In a sixth example illustrated in FIG. 7A, a screen is displayed on the display 480 as the predetermined screen, the screen including an icon "SCAN" corresponding to an instruction for scanning a document, an icon "MAIL" corresponding to an instruction for sending an email, an icon "FAX" corresponding to an instruction for sending a facsimile, and an icon "BOX" corresponding to an instruction for recording data in a predetermined area in the storing unit 440. In addition, in accordance with the setting and operation history of the instruction apparatus 100, the control unit 502 generates the instruction-apparatus operation screen 190 that is the same as or similar to that in the above-described first example (see FIG. 6A), and the instruction-apparatus operation screen 190 is displayed on the display 110.

In a seventh example illustrated in FIG. 7B, the same screen as that in the sixth example (see FIG. 7A) is displayed on the display 480 as the predetermined screen. In addition, in accordance with the setting and operation history of the instruction apparatus 100, the control unit 502 generates the instruction-apparatus operation screen 190 that is the same as or similar to that in the above-described second example (see FIG. 6B), and the instruction-apparatus operation screen 190 is displayed on the display 110.

In an eighth example illustrated in FIG. 7C, the same screen as that in the sixth example (see FIG. 7A) is displayed on the display 480 as the predetermined screen. In addition, in accordance with the setting and operation history of the instruction apparatus 100, the control unit 502 generates the instruction-apparatus operation screen 190 that is the same as or similar to that in the above-described fourth example (see FIG. 6D), and the instruction-apparatus operation screen 190 is displayed on the display 110.

Figure 8A:
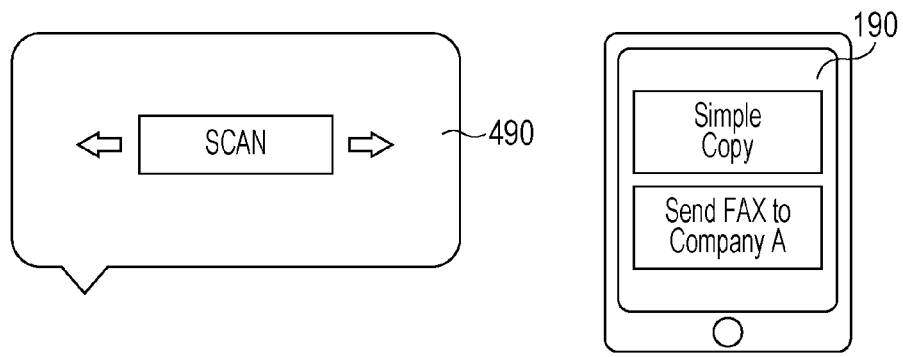
FIGS. 8A to 8C are third diagrams illustrating examples of the processing-apparatus operation screen and the instruction-apparatus operation screen.
Figure 8B:
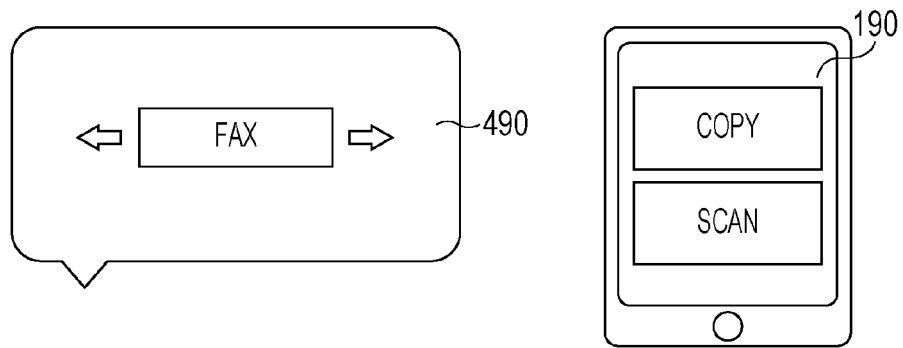
Figure 8C:
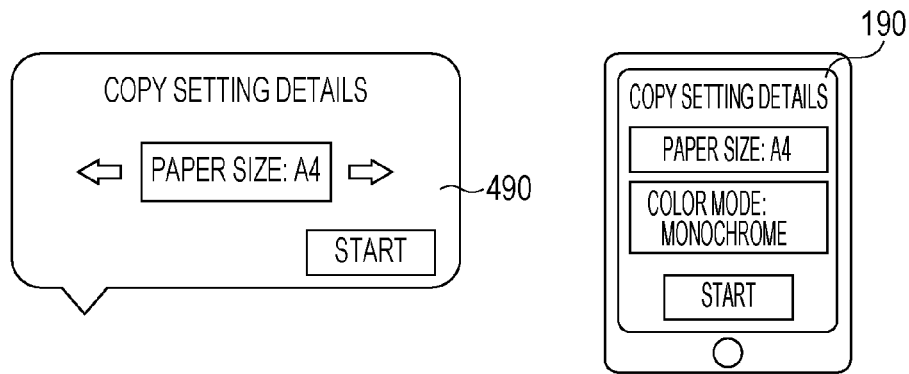

FIGS. 8A to 8C illustrate other examples of the processing-apparatus operation screen 490 and the instruction-apparatus operation screen 190 generated by the control unit 502. In the examples illustrated in FIGS. 8A to 8C, the display 480 of a processing apparatus 400 has a smaller display region than the processing-apparatus operation screen 490 illustrated in any of the first to fifth examples (see FIGS. 6A to 6E). Accordingly, in each of the following examples, it is not possible for the display 480 to display the processing-apparatus operation screen 490 illustrated in the first to fifth examples.

In a ninth example illustrated in FIG. 8A, in accordance with the setting and operation history of the instruction apparatus 100, the control unit 502 generates the instruction-apparatus operation screen 190 that is the same as or similar to that in the above-described first example (see FIG. 6A), and the instruction-apparatus operation screen 190 is displayed on the display 110. On the other hand, even if the processing-apparatus operation screen 490 that is the same as or similar to that in the above-described first example is generated, it is not possible to display the processing-apparatus operation screen 490 on the display 480 in this example because the display region of the display 480 is small. Accordingly, the control unit 502 generates the processing-apparatus operation screen 490 that may be displayed on the display 480. Specifically, as illustrated in FIG. 8A, the control unit 502 generates the processing-apparatus operation screen 490 on which an icon "SCAN" corresponding to an instruction for scanning and icons of arrows used for scrolling the screen are displayed.

In a tenth example illustrated in FIG. 8B, in accordance with the setting and operation history of the instruction apparatus 100, the control unit 502 generates the instruction-apparatus operation screen 190 that is the same as or similar to that in the above-described second example (see FIG. 6B), and the instruction-apparatus operation screen 190 is displayed on the display 110. On the other hand, even if the processing-apparatus operation screen 490 that is the same as or similar to that in the above-described second example is generated, it is not possible to display the processing-apparatus operation screen 490 on the display 480 in this example because the display region of the display 480 is small. Accordingly, the control unit 502 generates the processing-apparatus operation screen 490 that may be displayed on the display 480. Specifically, as illustrated in FIG. 8B, the control unit 502 generates the processing-apparatus operation screen 490 on which an icon "FAX" corresponding to an instruction for sending a facsimile and icons of arrows used for scrolling the screen are displayed.

In an eleventh example illustrated in FIG. 8C, in accordance with the setting and operation history of the instruction apparatus 100, the control unit 502 generates the instruction-apparatus operation screen 190 that is the same as or similar to that in the above-described fourth example (see FIG. 6D), and the instruction-apparatus operation screen 190 is displayed on the display 110. On the other hand, even if the processing-apparatus operation screen 490 that is the same as or similar to that in the above-described fourth example is generated, it is not possible to display the processing-apparatus operation screen 490 on the display 480 in this example because the display region of the display 480 is small. Accordingly, the control unit 502 generates the processing-apparatus operation screen 490 that may be displayed on the display 480. Specifically, as illustrated in FIG. 8C, the control unit 502 generates the processing-apparatus operation screen 490 on which an icon "PAPER SIZE: A4" corresponding to an instruction for selecting A4-sized paper and icons of arrows used for scrolling the screen are displayed.

Figure 9:
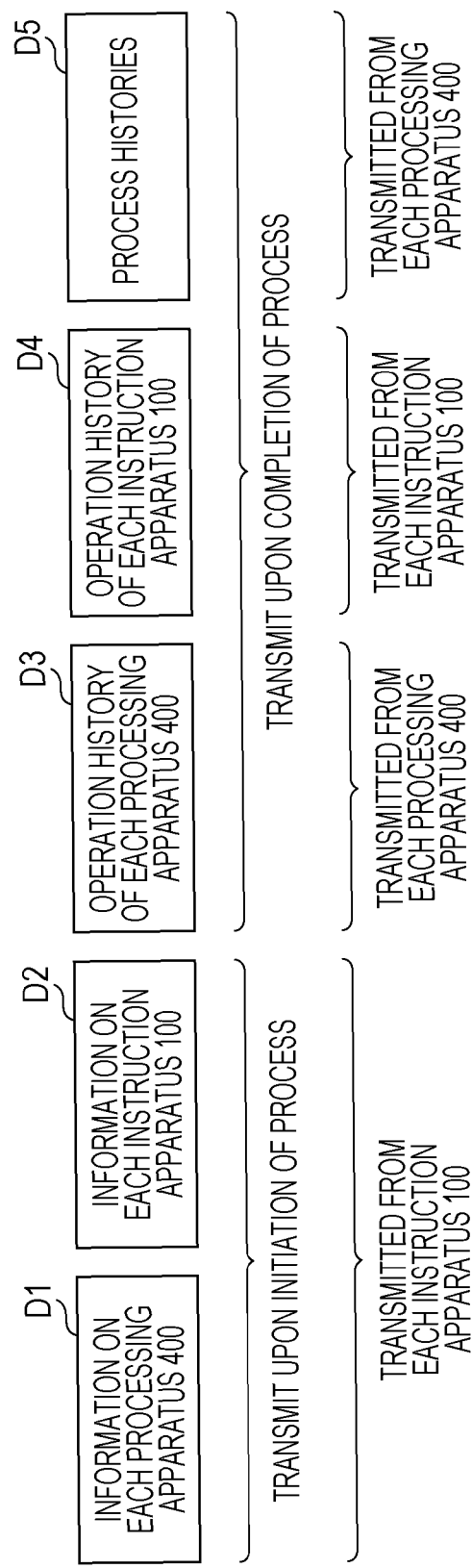
FIG. 9 illustrates data stored in a storing unit included in the management apparatus.

Although the above description has illustrated an exemplary case of using a single instruction apparatus 100, plural instruction apparatuses 100 may be used in the processing system 10 according to this exemplary embodiment. For example, smartphones carried by respective plural operators (users) who use the processing system 10 may be used as the instruction apparatuses 100. FIG. 9 illustrates data stored in the storing unit 530 of the management apparatus 500. As illustrated in FIG. 9, the storing unit 530 stores Data D1, which is information on each processing apparatus 400, Data D2, which is information on each instruction apparatus 100, Data D3, which is data on an operation history of each processing apparatus 400, Data D4, which is data on an operation history of each instruction apparatus 100, and Data D5, which is data on process histories (job histories).

Among these data items, Data D1, which is information on each processing apparatus 400, and Data D2, which is information on each instruction apparatus 100, are simultaneously transmitted from each instruction apparatus 100 to the management apparatus 500, as described above, upon initiation of an operator's operation.

Data D3, which is data on an operation history of each processing apparatus 400, and Data D4, which is data on an operation history of each instruction apparatus 100, are transmitted to the management apparatus 500, as described above, upon completion of a process performed by each processing apparatus 400. In addition, Data D5, which is data on process histories, is also transmitted to the management apparatus 500 upon completion of a process performed by each processing apparatus 400.

Data D3, which is data on an operation history of each processing apparatus 400, is transmitted from the processing apparatus 400 to the management apparatus 500, Data D4, which is data on an operation history of each instruction apparatus 100, is transmitted from the instruction apparatus 100 to the management apparatus 500, and Data D5, which is data on process histories, is transmitted from the processing apparatus 400 to the management apparatus 500.

FIG. 10 illustrates details of Data D1, which is information on each processing apparatus 400, and Data D2, which is information on each instruction apparatus 100. These data items are stored in a database of the storing unit 440 of each of the processing apparatuses 400. Accordingly, FIG. 10 also illustrates a structure of the database of the storing unit 440.

As illustrated in FIG. 10, in the information on each processing apparatus 400, information is stored for each of the processing apparatuses 400, such as the processing apparatuses 400A, 400B, and 400C. If there are more than three processing apparatuses 400, the database also stores information for each of the processing apparatuses 400.

In addition, in Data D2, which is information on each instruction apparatus 100, information is stored for each of the instruction apparatuses 100, such as the instruction apparatuses 100A, 100B, and 100C. If there are more than three instruction apparatuses 100, the database also stores information for each of the instruction apparatuses 100.

As described above, examples of Data D1, which is information on each processing apparatus 400, include equipped-function information, apparatus-status information, general apparatus information, and apparatus-setting information. In addition, a management identifier (ID) used by the management apparatus 500 is also stored as Data D1, which is information on each processing apparatus 400. Here, the management ID used by the management apparatus 500 corresponds to a universally unique identifier (UUID), and is generated, after the management apparatus 500 has acquired information, by the management apparatus 500 to be assigned to each of the processing apparatuses 400.

As described above, examples of Data D2, which is information on each instruction apparatus 100, include general apparatus information, apparatus-setting information, accessibility-setting information, and application-setting information. In addition, a management ID used by the management apparatus 500 is also stored as Data D2, which is information on each instruction apparatus 100. The management ID used by the management apparatus 500 corresponds to an UUID as in the case of the processing apparatuses 400.

Figure 11:
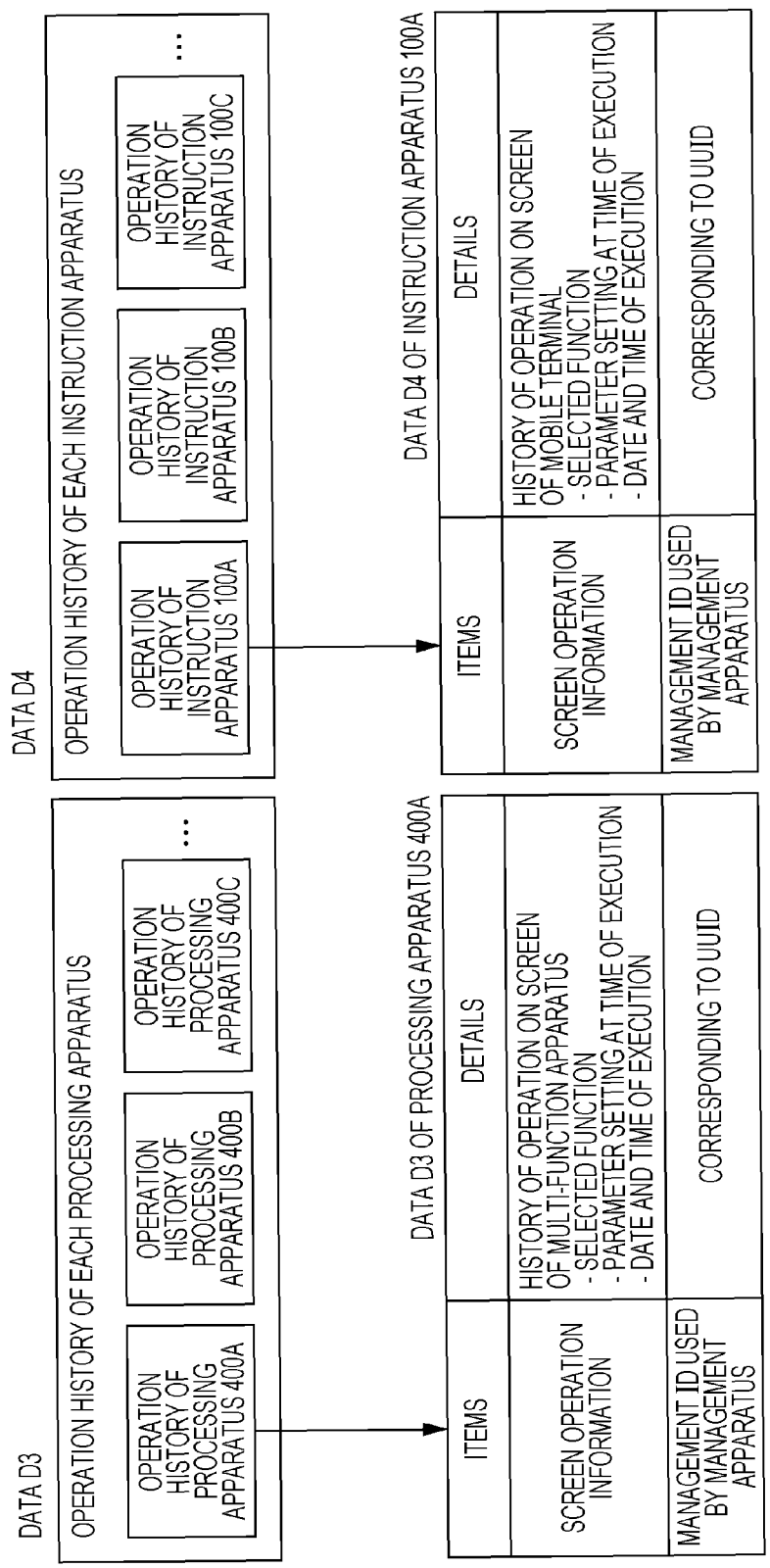
FIG. 11 illustrates details of data on an operator's operation history of each processing apparatus and an operator's operation history of each instruction apparatus.

FIG. 11 illustrates details of Data D3, which is data on an operator's operation history of each processing apparatus 400, and Data D4, which is data on an operator's operation history of each instruction apparatus 100. These data items are stored in a database of the storing unit 440 of each of the processing apparatuses 400. Accordingly, FIG. 11 also illustrates a structure of the database of the storing unit 440.

As illustrated in FIG. 11, in Data D3, data is stored for each of the processing apparatuses 400, such as the processing apparatuses 400A, 400B, and 400C. In addition, in Data D4, data is stored for each of the instruction apparatuses 100, such as the instruction apparatuses 100A, 100B, and 100C.

Data D3, which is data on an operation history of each processing apparatus 400, includes screen-operation information regarding an operation on the processing-apparatus operation screen 490 and the management ID used by the management apparatus 500. The screen-operation information is information regarding the history of operator's operations on the processing-apparatus operation screen 490, and more specifically, includes information regarding functions selected on the processing-apparatus operation screen 490, the parameter setting used at the time of performing a process, and the date and time at which the process was performed. As described above, the management ID used by the management apparatus 500 is generated by the management apparatus 500 and assigned to each of the processing apparatuses 400.

Data D4, which is data on an operation history of each instruction apparatus 100, includes screen-operation information regarding an operation on the instruction-apparatus operation screen 190 and the management ID used by the management apparatus 500. The screen-operation information is information regarding the history of operator's operations on the instruction-apparatus operation screen 190, and more specifically, includes information regarding functions selected on the instruction-apparatus operation screen 190, the parameter setting used at the time of performing a process, and the date and time at which the process was performed. As described above, the management ID used by the management apparatus 500 is generated by the management apparatus 500 and assigned to each of the instruction apparatuses 100.

Figure 12:
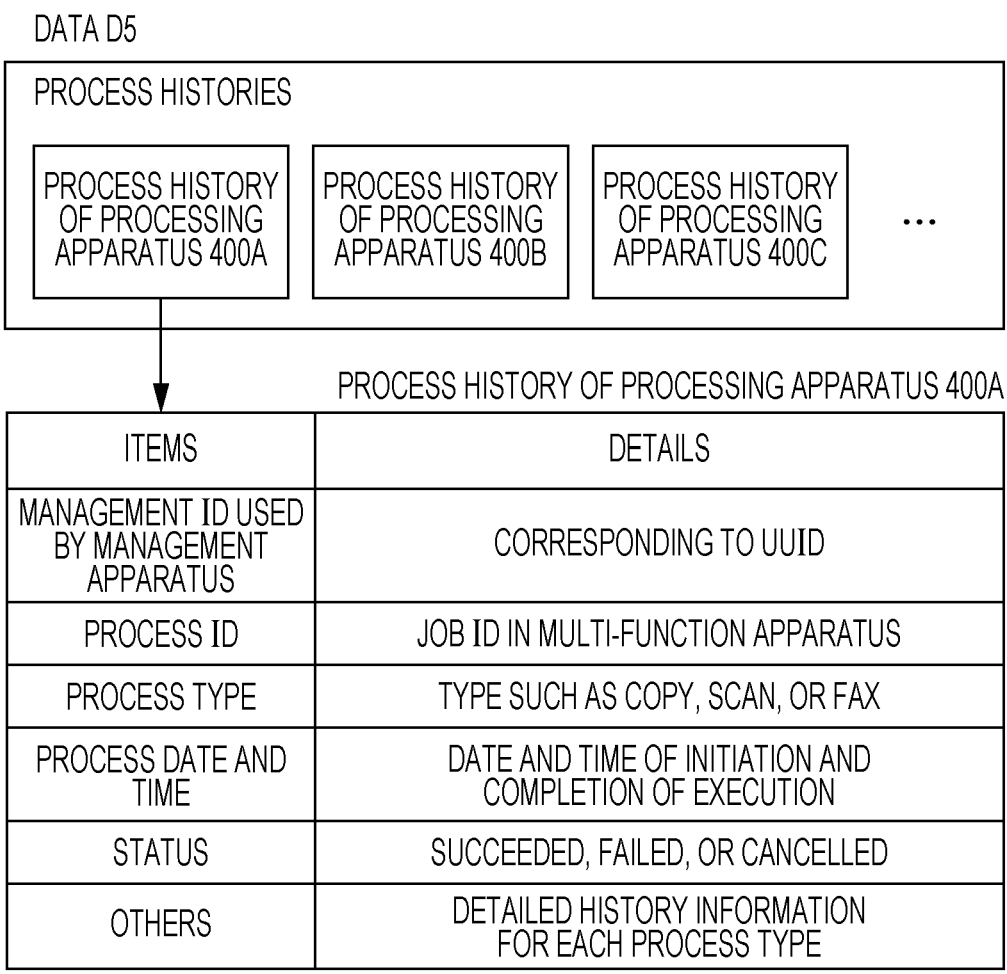
FIG. 12 illustrates details of data on process histories of the processing apparatuses.

FIG. 12 illustrates details of Data D5, which is data on process histories (job histories) of the processing apparatuses 400. This data is stored in a database of the storing unit 440 of each of the processing apparatuses 400. Accordingly, FIG. 12 also illustrates a structure of the database of the storing unit 440. As illustrated in FIG. 12, in Data D5, data is stored for each of the processing apparatuses 400, such as the processing apparatuses 400A, 400B, and 400C.

Data D5, which is data on process histories, includes information on the above-described management ID used by the management apparatus 500, a process ID (job ID), a process type (job type), a process date and time, status, and other items. The process ID is the ID of a process in each of the processing apparatuses 400. The process type is, for example, the type of a process, such as copying, scanning, or sending and receiving of a facsimile.

The process date and time includes the date and time at which the process was initiated and date and time at which the process was completed. In addition, the status means a process condition and indicates whether the process succeeded, failed, or was cancelled. Furthermore, depending on the process type, detailed process history information, such as the parameter setting for execution, is stored in accordance with the process type.

Figure 13:
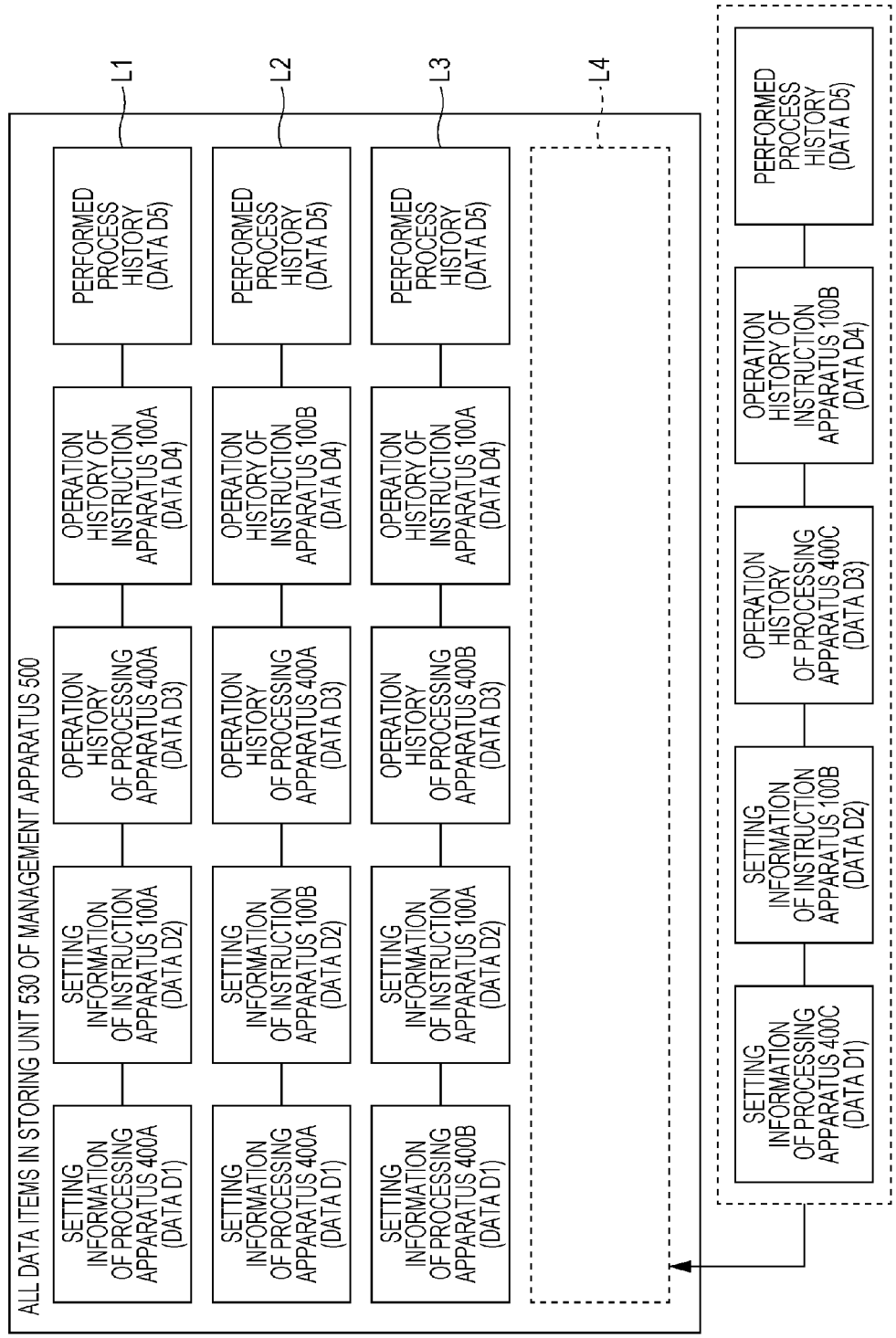
FIG. 13 illustrates a data structure to be stored in the storing unit of the management apparatus.

FIG. 13 illustrates a structure of data to be stored in the storing unit 530 of the management apparatus 500. As illustrated in FIG. 13, the above-described Data D1, which is information on each processing apparatus 400, Data D2, which is information on each instruction apparatus 100, Data D3, which is data on an operation history of each processing apparatus 400, Data D4, which is data on an operation history of each instruction apparatus 100, and Data D5, which is data on process histories, are stored in units of performed processes (units of jobs) in association with one another.

For example, in the example illustrated in FIG. 13, row L1 stores, in association with one another, Data D1, Data D2, Data D3, Data D4, and Data D5 regarding a process, the process having been performed by the processing apparatus 400A in response to an instruction from the instruction apparatus 100A. In addition, row L2 stores, in association with one another, Data D1, Data D2, Data D3, Data D4, and Data D5 regarding a process, the process having been performed by the processing apparatus 400A in response to an instruction from the instruction apparatus 100B. In addition, row L3 stores, in association with one another, Data D1, Data D2, Data D3, Data D4, and Data D5 regarding a process, the process having been performed by the processing apparatus 400B in response to an instruction from the instruction apparatus 100A.

Upon completion of a process in each of the processing apparatuses 400, Data D1, Data D2, Data D3, Data D4, and Data D5 regarding the completed process are added in association with one another in the storing unit 530 of the management apparatus 500. For example, as illustrated in FIG. 13, upon completion of a process that has been performed by the processing apparatus 400C in response to an instruction from the instruction apparatus 100A, Data D1, Data D2, Data D3, Data D4, and Data D5 regarding the completed process are added in association with one another in row L4. In the following description, Data D1, Data D2, Data D3, Data D4, and Data D5 associated with a process (job) are referred to as a data group.

By using the above-described data group, the control unit 502 generates the processing-apparatus operation screen 490 and the instruction-apparatus operation screen 190. At this time, it is not necessary for the control unit 502 to use all of the above-described data groups, and the control unit 502 may select and use, from among the above-described data groups, a data group that is appropriate for generating the processing-apparatus operation screen 490 and the instruction-apparatus operation screen 190. In addition, by using the above-described data group, the control unit 502 predicts an operator's desired function and generates the processing-apparatus operation screen 490 and the instruction-apparatus operation screen 190 on the basis of the prediction. The selection of the data group, prediction of the operator's desired function, and generation of the processing-apparatus operation screen 490 and the instruction-apparatus operation screen 190, which are performed by the control unit 502, will now be specifically described.

Figure 14:
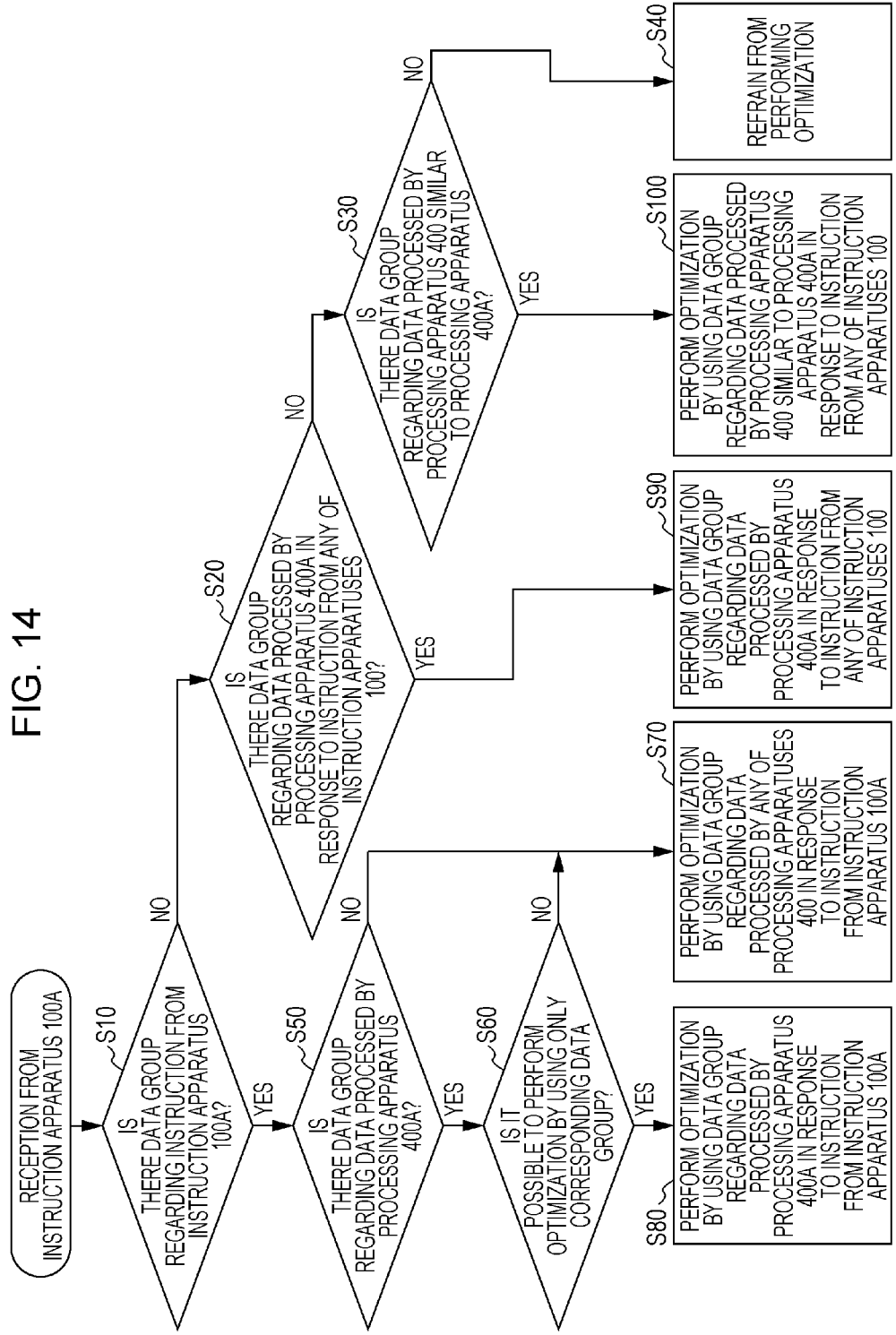
FIG. 14 is a flowchart illustrating selection of data groups by a control unit of the management apparatus.

FIG. 14 is a flowchart illustrating selection of a data group by the control unit 502. The following description illustrates an exemplary case where the instruction apparatus 100A instructs the processing apparatus 400A to perform a process and where the processing apparatus 400B and the processing apparatus 400C are similar to the processing apparatus 400A in terms of the setting and functions.

As illustrated in FIG. 14, upon reception, by the management apparatus 500, of an instruction from the instruction apparatus 100A, the control unit 502 starts to select a data group. That is, in step S10, the control unit 502 determines whether or not there is a data group regarding an instruction from the instruction apparatus 100A among the data groups (see FIG. 13) stored in the storing unit 530. That is, the control unit 502 determines whether or not there is a data group regarding an instruction from the same instruction apparatus 100 as the instruction apparatus 100 from which the above instruction has been received.

If it is determined that there is no corresponding data group in step S10, the process proceeds to step S20; if it is determined that there is a corresponding data group in step S10, the process proceeds to step S50.

In step S20, the control unit 502 determines whether or not there is a data group regarding data processed by the processing apparatus 400A although the instruction has not been sent from the instruction apparatus 100A (e.g., instruction has been sent from the instruction apparatus 100B or the instruction apparatus 100C). That is, the control unit 502 determines whether or not there is a data group regarding data processed by the same processing apparatus 400 as the processing apparatus 400 to be used in this process, in response to an instruction from any of the instruction apparatuses 100.

If it is determined that there is no corresponding data group in step S20, the process proceeds to step S30; if it is determined that there is a corresponding data group in step S20, the process proceeds to step S90.

In step S30, the control unit 502 determines whether or not the database includes a data group regarding data processed by the processing apparatus 400B or the processing apparatus 400C, which is similar to the processing apparatus 400A in terms of the setting and functions, in response to an instruction from any of the instruction apparatuses 100. That is, the control unit 502 determines whether or not the database includes a data group regarding data processed by a processing apparatus 400 that is similar to the processing apparatus 400 to be used in this process in terms of the setting and functions, in response to an instruction from any of the instruction apparatuses 100.

If it is determined that there is no corresponding data group in step S30, the process proceeds to step S40; if it is determined that there is a corresponding data group in step S30, the process proceeds to step S100.

If the process proceeds to step S40, the control unit 502 does not optimize the processing-apparatus operation screen 490 nor the instruction-apparatus operation screen 190 on the basis of the data stored in the database but generates predetermined screens as the processing-apparatus operation screen 490 and the instruction-apparatus operation screen 190.

In step S50, on the assumption that the instruction apparatus 100A has sent the instruction, the control unit 502 determines whether or not there is a data group regarding data processed by the processing apparatus 400A. That is, the control unit 502 determines whether or not there is a data group regarding data processed by the same processing apparatus 400 as the processing apparatus 400 to be used in this process, in response to an instruction from the same instruction apparatus 100 as the instruction apparatus 100 that has sent the instruction for this process.

If it is determined that there is a corresponding data group in step S50, the process proceeds to step S60; if it is determined that there is no corresponding data group in step S50, the process proceeds to step S70.

In step S60, the control unit 502 determines whether or not it is possible to optimize the instruction-apparatus operation screen 190 and the processing-apparatus operation screen 490 by using only the data group regarding data processed by the processing apparatus 400A in response to an instruction from the instruction apparatus 100A, the data group being stored in the database. That is, in step S60, the control unit 502 determines whether or not it is possible to optimize the instruction-apparatus operation screen 190 and the processing-apparatus operation screen 490 by using only the data group regarding data processed by the same processing apparatus 400 as the processing apparatus 400 to be used in this process, in response to an instruction from the same instruction apparatus 100 as the instruction apparatus 100 that has sent the instruction for this process.

Here, the determination as to whether or not it is possible to optimize the instruction-apparatus operation screen 190 and the processing-apparatus operation screen 490 by using only the data group regarding data processed by the same processing apparatus 400 as the processing apparatus 400 to be used in this process, in response to an instruction from the same instruction apparatus 100 as the instruction apparatus 100 that has sent the instruction for this process is performed on the basis of whether the number of extracted data groups is sufficient or whether the process date and time according to the extracted data groups is recent or old.

If it is determined in step S60 that it is possible to optimize the instruction-apparatus operation screen 190 and the like by using only the corresponding data group, the process proceeds to step S80; if it is determined in step S60 that it is not possible to optimize the instruction-apparatus operation screen 190 and the like by using only the corresponding data group, the process proceeds to step S70.

In step S70, the control unit 502 optimizes the instruction-apparatus operation screen 190 and the processing-apparatus operation screen 490 by using the data group regarding data processed by any of the processing apparatuses 400 in response to an instruction from the instruction apparatus 100A. That is, the control unit 502 optimizes the instruction-apparatus operation screen 190 and the processing-apparatus operation screen 490 by using the data group regarding data processed by any of the processing apparatuses 400 in response to an instruction from the same instruction apparatus 100 as the instruction apparatus 100 that has sent the instruction for this process.

In step S80, the control unit 502 optimizes the instruction-apparatus operation screen 190 and the processing-apparatus operation screen 490 by using the data group regarding data processed by the processing apparatus 400A in response to an instruction from the instruction apparatus 100A. That is, the control unit 502 optimizes the instruction-apparatus operation screen 190 and the processing-apparatus operation screen 490 by using the data group regarding data processed by the same processing apparatus 400 as the processing apparatus 400 to be used in this process, in response to an instruction from the same instruction apparatus 100 as the instruction apparatus 100 that has sent the instruction for this process.

In step S90, the control unit 502 optimizes the instruction-apparatus operation screen 190 and the processing-apparatus operation screen 490 by using the data group regarding data processed by the processing apparatus 400A in response to an instruction from any of the instruction apparatuses 100. That is, the control unit 502 optimizes the instruction-apparatus operation screen 190 and the processing-apparatus operation screen 490 by using the data group regarding data processed by the same processing apparatus 400 as the processing apparatus 400 to be used in this process, in response to an instruction from any of the instruction apparatuses 100.

In step S100, the control unit 502 optimizes the instruction-apparatus operation screen 190 and the processing-apparatus operation screen 490 by using the data group regarding data processed by the processing apparatus 400B or the processing apparatus 400C, which is similar to the processing apparatus 400A to be used in this process in terms of the setting and functions, in response to an instruction from any of the instruction apparatuses 100. That is, the control unit 502 optimizes the instruction-apparatus operation screen 190 and the processing-apparatus operation screen 490 by using the data group regarding data processed by a processing apparatus 400 that is similar to the processing apparatus 400 to be used in this process in terms of the setting and functions, in response to an instruction from any of the instruction apparatuses 100, the data group being stored in the database.

Figure 15:
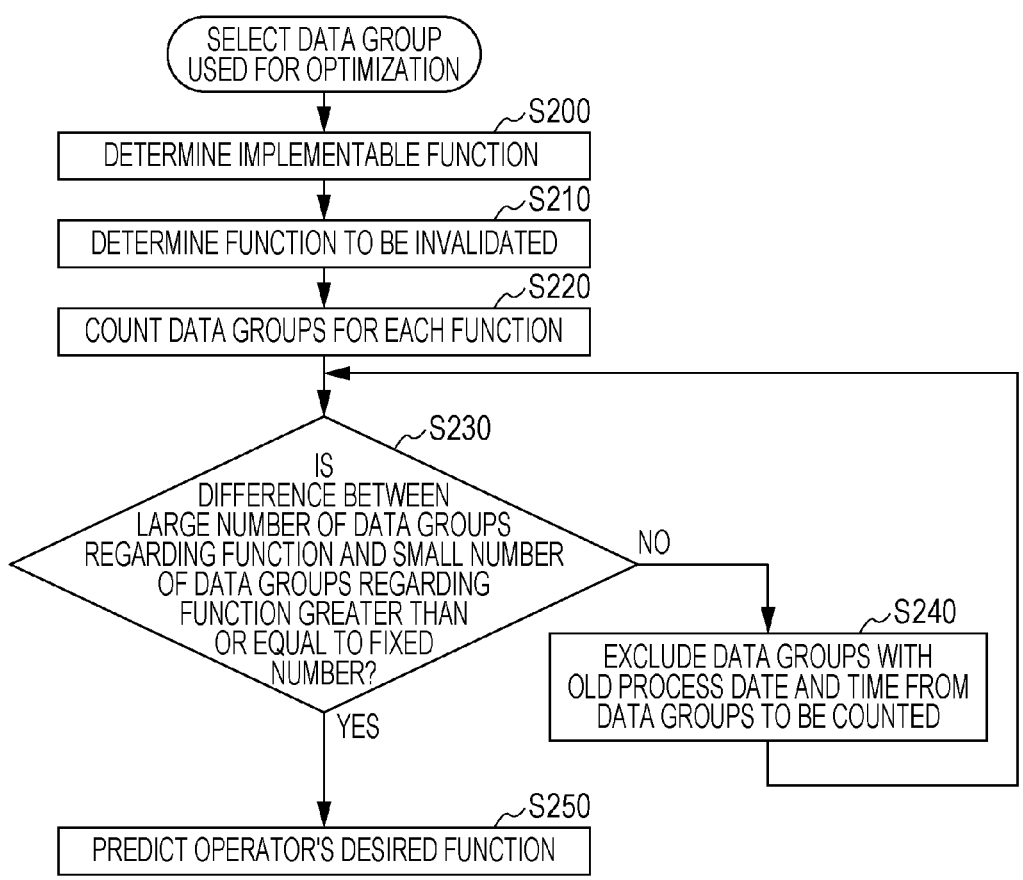
FIG. 15 is a flowchart illustrating a process in which the control unit of the management apparatus predicts an operator's desired function.

FIG. 15 is a flowchart illustrating a process in which the control unit 502 predicts an operator's desired function after the data group to be used for optimization has been selected. The following description will illustrate an exemplary case where the instruction apparatus 100A instructs the processing apparatus 400A to perform the process.

After selecting the data group to be used for optimization of the instruction-apparatus operation screen 190 and the like (see FIG. 14), in step S200, the control unit 502 determines a function that is implementable in the processing apparatus 400A. That is, the control unit 502 determines a function that is implementable in the processing apparatus 400 to be used in this process. This determination is performed on the basis of Data D1 (see FIG. 9), which is information on each processing apparatus 400.

In the next step, step S210, in order to optimize the instruction-apparatus operation screen 190 and the processing-apparatus operation screen 490, by referring to history data, the control unit 502 determines whether or not there is a data group to be invalidated. If there is a data group to be invalidated, the control unit 502 invalidates the data group. Specifically, by checking Data D1, which is information on each processing apparatus 400, stored in a database of the storing unit 530, the control unit 502 invalidates a data group regarding the same function as that being currently implemented. In addition, by referring to Data D5, which is data on process histories stored in a database of the storing unit 530, the control unit 502 invalidates a data group for which the process (job) status is not normal completion.

In the next step, step S220, the control unit 502 counts, for each of the functions that have been determined to be implementable in step S200, the number of data groups other than the data group that has been invalidated in step S210.

In the next step, step S230, the control unit 502 determines whether or not the difference between a large number of data groups regarding a function counted in step S220 and a small number of data groups regarding a function counted in step S220 is greater than or equal to a predetermined fixed number. If the difference in counted number is greater than or equal to the fixed number, the process proceeds to step S250; if the difference in counted number is not greater than or equal to the fixed number (if the difference in counted number is less than the fixed number), the process proceeds to step S240.

In step S240, from among the data groups that have been counted for each of the functions in step S220, the control unit 502 selects new data groups obtained after a predetermined specific date and time excluding, from the data groups other than the data group that has been invalidated in step S210, data groups for which the process date and time is before the specific date and time.

In step S250, the control unit 502 predicts that a function for which the difference between a large number of data groups regarding a function and a small number of data groups regarding a function obtained in step S230 is greater than or equal to the predetermined fixed number is a function desired by an operator. Here, the number of operator's desired functions predicted by the control unit 502 is not limited to one, and the control unit 502 may predict plural functions. That is, the control unit 502 may predict that one of the operator's desired functions is a copying function, or may predict plural functions as the operator's desired functions, such as "scanning and facsimiling", and "printing, storing in a box, and emailing".

As in the prediction of the operator's desired function described above, the control unit 502 predicts various parameters desired by the operator.

Figure 16:
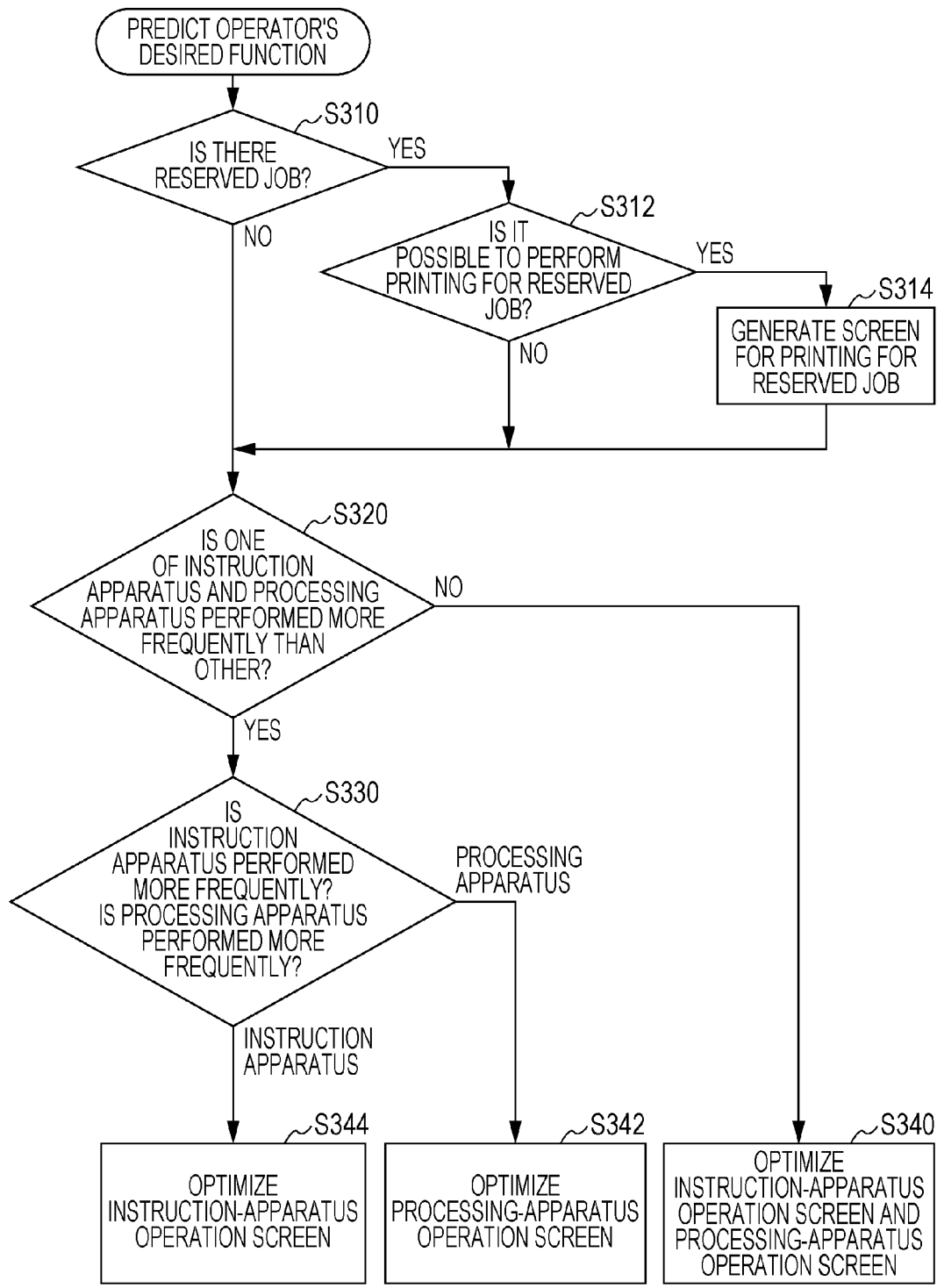
FIG. 16 is a flowchart illustrating generation of an instruction-apparatus operation screen and a processing-apparatus operation screen by the control unit of the management apparatus.

FIG. 16 is a flowchart illustrating generation of the instruction-apparatus operation screen 190 and the processing-apparatus operation screen 490 by the control unit 502 after the function and parameters desired by the operator have been predicted.

After the prediction of the function and parameters desired by the operator has been completed (see FIG. 15), in step S310, the control unit 502 determines whether or not there is a job for which a process is reserved (reserved job), the job having been stored by the operator in the data storing apparatus 600. If it is determined that there is a reserved job, the process proceeds to step S312; if it is determined that there is no reserved job, the process proceeds to step S320.

In step S312, the control unit 502 determines whether or not it is possible to perform printing for the reserved job stored in the data storing apparatus 600, by using the processing apparatus 400 that has been instructed to perform this process. If it is possible to perform printing, the process proceeds to step S314; if it is not possible to perform printing, the process proceeds to step S312.

In step S314, the control unit 502 generates a screen indicating an instruction for printing for the reserved job (see FIG. 6C).

In step S320, the control unit 502 determines whether or not one of the display 110 of the instruction apparatus 100 and the display 480 of the processing apparatus 400 has been operated more frequently than the other. Here, the determination as to whether or not one of the display 110 of the instruction apparatus 100 and the display 480 of the processing apparatus 400 has been operated more frequently than the other is performed by using Data D3, which is data on an operation history of each processing apparatus 400 stored in the database, and Data D4, which is data on an operation history of each instruction apparatus 100 stored in the database. For example, if the ratio between the number of operations performed by using one of the display 480 and the display 110 and the number of operations performed by using the other is greater than or equal to a certain value, it is determined that one of the display 480 and the display 110 has been operated more frequently than the other.

If it is determined in step S320 that one of the display 480 and the display 110 has been operated more frequently than the other, the process proceeds to step S330; if it is determined in step S320 that one of the display 480 and the display 110 is not operated more frequently than the other, the process proceeds to step S340.

In step S330, the control unit 502 determines which of the display 110 of the instruction apparatus 100 and the display 480 of the processing apparatus 400 has been more frequently used for operation. If it is determined that the display 480 of the processing apparatus 400 has been more frequently used for operation, the process proceeds to step S342; if it is determined that the display 110 of the instruction apparatus 100 has been more frequently used for operation, the process proceeds to step S344.

In step S340, the control unit 502 optimizes both of the instruction-apparatus operation screen 190 and the processing-apparatus operation screen 490.

In step S342, the control unit 502 optimizes the processing-apparatus operation screen 490 and generates, as the instruction-apparatus operation screen 190, a supplemental menu screen that supplements the processing-apparatus operation screen 490.

In step S344, the control unit 502 optimizes the instruction-apparatus operation screen 190 and generates, as the processing-apparatus operation screen 490, a supplemental menu screen that supplements the instruction-apparatus operation screen 190.

Figure 17:
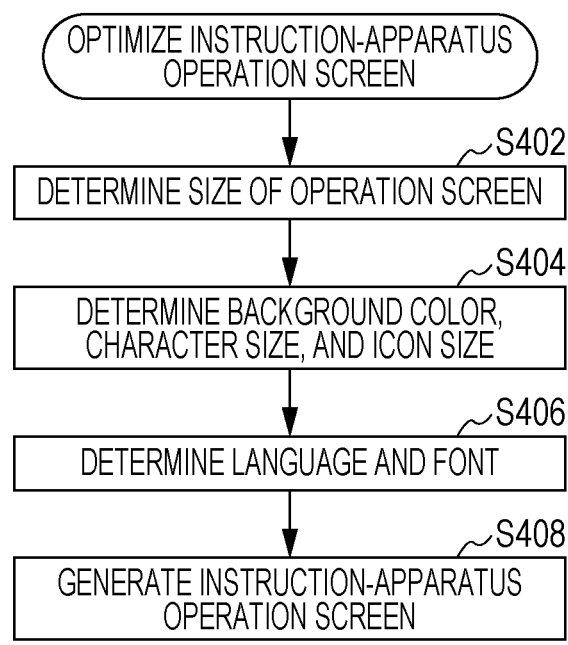
FIG. 17 is a flowchart illustrating a process for optimizing the instruction-apparatus operation screen.

FIG. 17 is a flowchart illustrating a process for optimizing the instruction-apparatus operation screen 190. If the instruction-apparatus operation screen 190 is to be optimized (see steps S340 and S344 in FIG. 16), in step S402, the control unit 502 checks the size of the screen displayed on the display 110 from Data D2, which is information on the instruction apparatus 100, to determine the size of the instruction-apparatus operation screen 190.

In the next step, step S404, the control unit 502 checks the accessibility setting from Data D2, which is information on the instruction apparatus 100, to determine, on the basis of the accessibility setting, the background color of the instruction-apparatus operation screen 190, the size of characters to be displayed on the instruction-apparatus operation screen 190, and the size of icons to be displayed on the instruction-apparatus operation screen 190.

In the next step, step S406, from Data D2, which is information on the instruction apparatus 100, the control unit 502 determines the language used on the instruction-apparatus operation screen 190 to be displayed and the font of the language to be displayed on the instruction-apparatus operation screen 190.

In the next step, step S408, on the basis of the determination in steps S402, S404, and S406, the control unit 502 generates the optimized instruction-apparatus operation screen 190.

Figure 18:
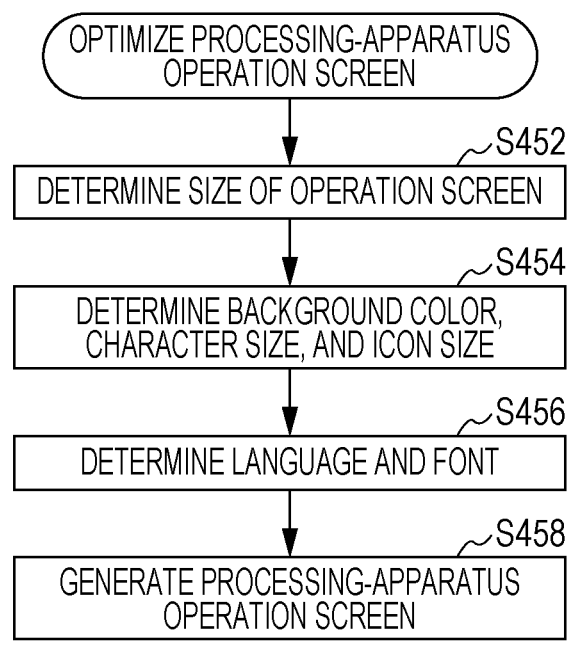
FIG. 18 is a flowchart illustrating a process for optimizing the processing-apparatus operation screen.

FIG. 18 is a flowchart illustrating a process for optimizing the processing-apparatus operation screen 490. If the processing-apparatus operation screen 490 is to be optimized (see steps S342 and S344 in FIG. 16), in step S452, the control unit 502 checks the size of the screen displayed on the display 480 from Data D1, which is information on each processing apparatus 400, to determine the size of the processing-apparatus operation screen 490.

In the next step, step S454, the control unit 502 checks the accessibility setting from Data D1, which is information on each processing apparatus 400, to determine, on the basis of the accessibility setting, the background color of the processing-apparatus operation screen 490, the size of characters to be displayed on the processing-apparatus operation screen 490, and the size of icons to be displayed on the processing-apparatus operation screen 490.

In the next step, step S456, from Data D1, which is information on each processing apparatus 400, the control unit 502 determines the language used on the processing-apparatus operation screen 490 to be displayed and the font of the language to be displayed on the processing-apparatus operation screen 490.

In the next step, step S458, on the basis of the determination in steps S452, S454, and S456, the control unit 502 generates the optimized processing-apparatus operation screen 490.

Second Exemplary Embodiment

Next, a second exemplary embodiment of the present invention will be described. In the processing system 10 according to the above-described first exemplary embodiment, the instruction apparatus 100 acquires information on each processing apparatus 400, and then the instruction apparatus 100 simultaneously transmits the acquired information on each processing apparatus 400 and information on the instruction apparatus 100 to the management apparatus 500 before a process. In contrast, in this second exemplary embodiment, a processing apparatus 400 acquires information on the instruction apparatus 100, and then the processing apparatus 400 simultaneously transmits the acquired information on the instruction apparatus 100 and information on the processing apparatus 400 to the management apparatus 500 before a process.

In the second exemplary embodiment, a wireless communication unit 420 is used as an information acquiring unit that acquires information on the instruction apparatus 100 and also as an apparatus-information transmitting unit that simultaneously transmits the acquired information on the instruction apparatus 100 and the information on the processing apparatus 400 to the management apparatus 500.

As described above, the present invention is applicable to an instruction apparatus, a processing apparatus, a processing system, a non-transitory computer readable medium, and a method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An instruction apparatus that instructs a processing apparatus to perform a process, the instruction apparatus comprising:
an information acquiring unit that acquires information regarding the processing apparatus;
an apparatus-information transmitting unit that simultaneously transmits the information regarding the processing apparatus acquired by the information acquiring unit and information regarding the instruction apparatus to a management apparatus; and
a display,
wherein, based on the information regarding the processing apparatus and the information regarding the instruction apparatus transmitted from the apparatus-information transmitting unit, an operation-screen generating unit included in the management apparatus generates an instruction-apparatus operation screen, an operation-screen transmitting unit included in the management apparatus transmits information of the instruction-apparatus operation screen to the instruction apparatus, and the display displays the instruction-apparatus operation screen,
wherein the information regarding the processing apparatus includes at least one of equipped-function information regarding the functions with which the processing apparatus is equipped, status information indicating an operating status of the processing apparatus, general apparatus information indicating identifying information of the processing apparatus, and apparatus-setting information regarding settings of the processing apparatus, and
wherein the information regarding the instruction apparatus includes at least one of general information identifying the information apparatus, and setting information regarding settings of the information apparatus.

2. The instruction apparatus according to claim 1, wherein the display displays an instruction-apparatus operation screen generated by the operation-screen generating unit in accordance with an operation history of the instruction apparatus.

3. The instruction apparatus according to claim 1, wherein the display displays an instruction-apparatus operation screen generated by the operation-screen generating unit in accordance with an operation history of at least one of the instruction apparatus and the processing apparatus, the operation history being stored in an operation-history storing unit included in the management apparatus.

4. The instruction apparatus according to claim 3, further comprising an operation-history transmitting unit that transmits, after completion of an operator's operation, data regarding a history of the operator's operation to the management apparatus, and the operation-history storing unit stores the data regarding the history of the operator's operation.

5. The instruction apparatus according to claim 1, wherein the display displays an instruction-apparatus operation screen generated by the operation-screen generating unit in accordance with a setting of the instruction apparatus.

6. The instruction apparatus according to claim 1, wherein the display displays an instruction-apparatus operation screen generated by the operation-screen generating unit in accordance with a setting of the processing apparatus.

7. The instruction apparatus according to claim 1, wherein the display displays an instruction-apparatus operation screen that is a different screen from a processing-apparatus operation screen displayed on a display included in the processing apparatus.

8. The instruction apparatus according to claim 1, wherein the display performs display in such a manner as to encourage processing of data stored in a data storing apparatus that stores data to be processed, if the data storing apparatus stores data.

9. A processing apparatus that performs a process in response to an instruction from an instruction apparatus, the processing apparatus comprising:
- an information acquiring unit that acquires information regarding the instruction apparatus;
- an apparatus-information transmitting unit that simultaneously transmits the information regarding the instruction apparatus acquired by the information acquiring unit and information regarding the processing apparatus to a management apparatus; and
- a display,
- wherein, based on the information regarding the instruction apparatus and the information regarding the processing apparatus transmitted from the apparatus-information transmitting unit, an operation-screen generating unit included in the management apparatus generates an operation screen, an operation-screen transmitting unit included in the management apparatus transmits information of the operation screen to the instruction apparatus, and the display displays the operation screen,
- wherein the information regarding the processing apparatus includes at least one of equipped-function information regarding the functions with which the processing apparatus is equipped, status information indicating an operating status of the processing apparatus, general apparatus information indicating identifying information of the processing apparatus, and apparatus-setting information regarding settings of the processing apparatus, and
- wherein the information regarding the instruction apparatus includes at least one of general information identifying the information apparatus, and setting information regarding settings of the information apparatus.

10. A processing system comprising:
- a processing apparatus;
- an instruction apparatus that instructs the processing apparatus to perform a process; and
- a management apparatus that manages the instruction apparatus and the processing apparatus, wherein
- the instruction apparatus includes
  - an information acquiring unit that acquires information regarding the processing apparatus, and
  - an apparatus-information transmitting unit that simultaneously transmits the information regarding the processing apparatus acquired by the information acquiring unit and information regarding the instruction apparatus to the management apparatus, and
- the management apparatus includes
  - an operation-screen generating unit that generates, based on the information regarding the processing apparatus and the information regarding the instruction apparatus transmitted from the apparatus-information transmitting unit, at least an instruction-apparatus operation screen to be displayed on a display included in the instruction apparatus, and
  - an operation-screen transmitting unit that transmits information of the instruction-apparatus operation screen generated by the operation-screen generating unit to the instruction apparatus,
- wherein the information regarding the processing apparatus includes at least one of equipped-function information regarding the functions with which the processing apparatus is equipped, status information indicating an operating status of the processing apparatus, general apparatus information indicating identifying information of the processing apparatus, and apparatus-setting information regarding settings of the processing apparatus, and
- wherein the information regarding the instruction apparatus includes at least one of general information identifying the information apparatus, and setting information regarding settings of the information apparatus.

11. The processing system according to claim 10, wherein
- the operation-screen generating unit further generates a processing-apparatus operation screen to be displayed on a display included in the processing apparatus, and
- the operation-screen transmitting unit further transmits information of the processing-apparatus operation screen that has been generated by the operation-screen generating unit and that is to be displayed on the display included in the processing apparatus.

12. A processing system comprising:
- a processing apparatus;
- an instruction apparatus that instructs the processing apparatus to perform a process; and
- a management apparatus that manages the instruction apparatus and the processing apparatus, wherein
- the processing apparatus includes
  - an information acquiring unit that acquires information regarding the instruction apparatus, and
  - an apparatus-information transmitting unit that simultaneously transmits the information regarding the instruction apparatus acquired by the information acquiring unit and information regarding the processing apparatus to the management apparatus, and
- the management apparatus includes
  - an operation-screen generating unit that generates, based on the information regarding the instruction apparatus and the information regarding the processing apparatus transmitted from the apparatus-information transmitting unit, at least a processing-apparatus operation screen to be displayed on a display included in the processing apparatus, and
  - an operation-screen transmitting unit that transmits information of the processing-apparatus operation screen generated by the operation-screen generating unit to the processing apparatus,
- wherein the information regarding the processing apparatus includes at least one of equipped-function information regarding the functions with which the processing apparatus is equipped, status information indicating an operating status of the processing apparatus, general apparatus information indicating identifying information of the processing apparatus, and apparatus-setting information regarding settings of the processing apparatus, and
- wherein the information regarding the instruction apparatus includes at least one of general information identifying the information apparatus, and setting information regarding settings of the information apparatus.

13. The processing system according to claim 12, wherein
- the operation-screen generating unit further generates an instruction-apparatus operation screen to be displayed on a display included in the instruction apparatus, and
- the operation-screen transmitting unit further transmits information of the instruction-apparatus operation screen that has been generated by the operation-screen generating unit and that is to be displayed on the display included in the instruction apparatus.

* * * * *